United States Patent
Prasad et al.

(10) Patent No.: US 10,531,430 B2
(45) Date of Patent: ***Jan. 7, 2020

(54) METHOD FOR PROVIDING MULTICAST/BROADCAST SERVICE CONTINUITY FOR MOBILE TERMINALS

(71) Applicant: NEC Corporation, Tokyo (JP)

(72) Inventors: Athul Prasad, Helsinki (FI); Genadi Velev, Darmstadt (DE)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,269

(22) Filed: Jan. 11, 2019

(65) Prior Publication Data

US 2019/0166580 A1  May 30, 2019

Related U.S. Application Data

(63) Continuation of application No. 14/902,043, filed as application No. PCT/EP2014/063983 on Jul. 1, 2014, now Pat. No. 10,219,245.

(30) Foreign Application Priority Data

Jul. 1, 2013 (EP) ..................................... 13174549
Aug. 23, 2013 (EP) ..................................... 13181556
(Continued)

(51) Int. Cl.
*H04W 72/00* (2009.01)
*H04W 4/06* (2009.01)
(Continued)

(52) U.S. Cl.
CPC ....... *H04W 72/005* (2013.01); *H04L 12/1868* (2013.01); *H04W 4/06* (2013.01);
(Continued)

(58) Field of Classification Search
CPC ...... H04W 72/005; H04W 4/06; H04L 12/18; H04L 2001/0093; H04L 1/0026; H04L 65/4076
See application file for complete search history.

(56) References Cited

U.S. PATENT DOCUMENTS

| | | | |
|---|---|---|---|
| 10,219,245 B2* | 2/2019 | Prasad | H04W 4/06 |
| 2003/0119452 A1* | 6/2003 | Kim | H04W 52/143 455/69 |

(Continued)

FOREIGN PATENT DOCUMENTS

| | | |
|---|---|---|
| EP | 2107700 A1 | 10/2009 |
| WO | WO 2008052382 A1 | 5/2008 |

OTHER PUBLICATIONS

U.S. Appl. No. 14/902,043, filed Dec. 30, 2015.
(Continued)

*Primary Examiner* — Christopher M Crutchfield
(74) *Attorney, Agent, or Firm* — Leydig, Voit & Mayer, Ltd.

(57) ABSTRACT

A user equipment (UE) provides service continuity when the UE is about to move out of coverage of a Multimedia Broadcast Multicast Service (MBMS). The UE: receives MBMS data via an MBMS bearer; detects that the UE is suffering from a bad MBMS bearer condition; informs a server of the bad MBMS conditions to initiate switching to unicast; wherein, if there is downlink data to deliver during switching, the UE begins to receive the downlink data via unicast and to continues to receive downlink data via the MBMS bearer until the switching to the unicast bearer is complete. The UE is configured to determine a quality of the MBMS bearer relative to a threshold, which is dependent on service type, for indicating that the MBMS bearer quality is not acceptable. When the threshold is reached, the UE sends a message to the server.

10 Claims, 12 Drawing Sheets

(30) Foreign Application Priority Data

Sep. 11, 2013 (EP) .................................. 13183988
Oct. 25, 2013 (EP) .................................. 13190350

(51) Int. Cl.
| | |
|---|---|
| *H04W 36/00* | (2009.01) |
| *H04W 60/04* | (2009.01) |
| *H04L 12/18* | (2006.01) |
| *H04W 72/04* | (2009.01) |
| *H04W 72/08* | (2009.01) |

(52) U.S. Cl.
CPC .... *H04W 36/0007* (2018.08); *H04W 36/0016* (2013.01); *H04W 36/0088* (2013.01); *H04W 60/04* (2013.01); *H04W 72/048* (2013.01); *H04W 72/085* (2013.01)

(56) References Cited

U.S. PATENT DOCUMENTS

| | | | |
|---|---|---|---|
| 2007/0011503 A1 | 1/2007 | Kitani et al. | |
| 2009/0196213 A1* | 8/2009 | Zhong | H04W 36/06 370/312 |
| 2010/0208707 A1 | 8/2010 | Hamabe et al. | |
| 2010/0216454 A1* | 8/2010 | Ishida | H04W 72/005 455/424 |
| 2011/0083153 A1* | 4/2011 | Cedervall | H04L 65/4076 725/88 |

OTHER PUBLICATIONS

"Universal Mobile Telecommunications System (UMTS); Introduction of the Multimedia Broadcast/Multicast Service (MBMS) in the Radio Access Network (RAN); Stage 2 (3GPP TS 25.346 version 7.7.0 Release 7); ETSI TS 125 346", IEEE, LIS, Sophia Antipolis Cedex, France, vol. 3-R2, No. V7.7.0, Apr. 1, 2008 (Apr. 1, 2008), XP014041744.

Lecompte D ET: "Evolved multimedia broadcast/multicast service (eMBMS) in LTE-advanced: overview in Rel-11 enhancements", IEEE Communications Magazine, IEEE Service Center, Piscataway, US; The Institution of Electrical Engineers, Stevenage, GB, vol. 50, No. 11, Nov. 1, 2012 (Nov. 1, 2012), pp. 68-74, XP002730488.

ETSI TS 123 246 V11.1.0 (Nov. 2013), Universal Mobile Telecommunications System (UMTS); LTE; Multimedia Broadcast/Multicast Service (MBMS); Architecture and functional description (3GPP TS 23.246 version 11.1.0 Release3 11), pp. 1-68, Nov. 2012.

3GPP TS 23.401 V12.1.0 (Jun. 2013), $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), pp. 1-291, Jun. 2013.

ETSI TS 136 304 V11.5.0 (Sep. 2013), LTE; Evolved Universal Terrestrial Radio Access (E-UTRA); User Equipment (UE) procedures in idle mode (3GPP TS 36.304 version 11.5.0 Release 11), 1-36, Sep. 2013.

ETSI TS 126 346 V11.4.0 (Apr. 2013), "Universal Mobile Telecommunications System (UMTS); LTE; Multimedia Broadcast/Multicast Service (MBMS)"; Protocols and codecs (3GPP TS 26.346 version 11.4.0 Release 11), pp. 1-171, Apr. 2013.

ETSI TS 136 300 V11.5.0 (Apr. 2013), LTE; Evolved Universal Terrestrial Radio Access (E-UTRA) and Evolved Universal Terrestrial Radio Access Network (E-UTRAN); Overall description; Stage 2 (3GPP TS 36.300 version 11.5.0 Release 11, pp. 1-223, Apr. 2013.

3GPP TS 22.468 V0.3.0 (Feb. 2013), $3^{rd}$ Generation Partnership Project; Technical Specification Group Services and System Aspects; Group Communication System Enablers for LTE; (GCSE_LTE) Release 12, pp. 1-16, Feb. 2013.

ETSI TS 136 331 V11.2.0 (Feb. 2013), LTE; Evolved Universal Terrestrial Radio Access (E-UTRA); Radio Resource Control (RRC); Protocol specification (3GPP TS 36.331 version 11.2.0 Release 11), pp. 1-345, Feb. 2013.

* cited by examiner

METHOD FOR PROVIDING MULTICAST/BROADCAST SERVICE CONTINUITY FOR MOBILE TERMINALS

CROSS REFERENCE TO RELATED APPLICATIONS

This application is a continuation of U.S. patent application Ser. No. 14/902,043, filed on Dec. 30, 2015, which is a U.S. National Stage Application under 35 U.S.C. § 371 of International Application No. PCT/EP2014/063983, filed on Jul. 1, 2014, and claims benefit to European Patent Application Nos. EP 13174549.9, filed on Jul. 1, 2013, EP 13181556.5, filed on Aug. 23, 2013, EP 13183988.8, filed on Sep. 11, 2013 and EP 13190350.2, filed on Oct. 25, 2013; the entire contents of each of which are hereby incorporated by reference herein. The International Application was published in English on Jan. 8, 2015 as WO 2015/000912 A1 under PCT Article 21(2).

FIELD

The present invention relates to a method for providing multicast/broadcast service continuity for mobile terminals in a radio access network, wherein said mobile terminals register with a base station of said radio access network regarding said multicast/broadcast service and wherein said base station transmits multicast/broadcast service related data as group communications to said registered mobile terminals. Furthermore, the present invention relates to a corresponding base station and a corresponding mobile terminal.

BACKGROUND

Abbreviations as used herein are as follows:

| | |
|---|---|
| APN | Access Point Name |
| BLER | Block Error Rate |
| BM-SC | Broadcast Multicast - Service Center |
| DRB | Default Radio Bearer |
| eMBMS | Evolved Multimedia Broadcast Multicast Service |
| eNB | Evolved Node B (also called base station, RNC, etc.) |
| EPC | Evolved Packet Core |
| E-RAB | EUTRAN Radio Access Bearers |
| EPS | Evolved Packet System |
| E-UTRA | Evolved Universal Terrestrial Radio Access |
| E-UTRAN | Evolved Universal Terrestrial Radio Access Network |
| GBR | Guaranteed Bit Rate |
| GC | Group Communication |
| GC-AS | Group Communication - Application Server |
| GCSE | Group Communication System Enabler |
| IMS | IP Multimedia Subsystem |
| LTE | Long Term Evolution |
| MAC | Media Access Control |
| MBMS | Multimedia Broadcast Multicast Service |
| MBMS-GW | MBMS-Gateway |
| MBSFN | Multimedia Broadcast Multicast Service Single Frequency Network |
| MCE | Multi-Cell/Multicast Coordination Entity |
| MCH | Multicast Channel |
| MCCH | Multicast Control Channel |
| MCS | Modulation and Coding Scheme |
| MME | Mobility Management Entity |
| MRB | MBMS Point to Multipoint Radio Bearer |
| NAS | Non-Access Stratum |
| OMA-DM | Open Mobile Alliance - Device Management |
| PDCP | Packet Data Convergence Protocol |
| PDN-GW | Packet Data Network Gateway |
| PMCH | Physical Multicast Channel |
| RNC | Radio Network Controller |
| RRC | Radio Resource Control |
| RSRP | Reference Signal Received Power |
| RSRQ | Reference Signal Received Quality |
| SIB | System Information Block |
| SINR | Signal to Interference Noise Ratio |
| TMGI | Temporary Mobile Group Identity |
| QCI | QoS Class Identifier |
| QoS | Quality of Service |

MBMS (Multimedia Broadcast Multicast Service) is a point-to-multipoint service specified by the 3GPP where data can be transmitted from one source to multiple receivers. Evolved MBMS (eMBMS) was defined in 3GPP LTE Releases 10 and 11 to improve the performance using flexible and enhanced bit rates, single frequency network (SFN) operations and physical layer carrier configuration flexibility (see, for reference, D. Lecompte, et al.: "Evolved Multimedia Broadcast/Multicast Service (eMBMS) in LTE-Advanced: Overview and Rel-11 Enhancements", IEEE Commun. Mag., vol. 50, no. 11, pp. 68-74, November 2012, briefly denoted [1] hereinafter). It also enables delivery of high-quality content to multiple UEs with enhanced QoS in areas which MBMS services are provisioned. A possible deployment option of MBMS service using a pre-defined area is as shown in FIG. 1.

In FIG. 1, MBSFN service area is the area where all eNBs can be synchronized to provide MBSFN transmission and could contain multiple MBSFN areas. As seen in FIG. 1, an (e)MBMS service area can include multiple MBSFN areas, but also single eNBs that are not part of any MBSFN area. From a UE perspective, all transmissions from a single MBSFN area eNBs are seen as a single transmission. The cells within an MBSFN area will advertise its availability and UEs can consider a subset of MBSFN areas that are configured. As shown in the figure, there could be reserved cells within MBSFN area which does not have any MBSFN transmissions and can use the resource allocated for MBSFN in neighboring cells for other services. In other words, these reserved cells transmit the (e)MBMS data in different radio resources than the MBSFN area. But the maximum transmit power that can be allocated for such resources are limited so as to not cause interference to MBSFN cells. MBMS reception is possible for UEs in RRC_CONNECTED or RRC_IDLE states. Whenever receiving MBMS services, a user shall be notified of an incoming call, and can make outgoing calls (as specified in 3GPP TS 36.300, "E-UTRA and E-UTRAN: Overall description; Stage 2," v 11.5.0, March 2013, briefly denoted [2] hereinafter). As explained, the terms MBSFN service area and (e)MBMS service area have different meaning, but in the context of the present invention these terms may be used in an interchangeable manner, i.e. expressing in general an area where the UE receives (e)MBMS data via (e)MBMS bearer service.

An (e)MBMS bearer service is identified by an IP multicast address, an APN network identifier and also by a TMGI (Temporary Mobile Group Identity) inside one PLMN. With other words, the UE can use the TMGI as ID for the (e)MBMS bearer service over certain access technology. For example the UTRAN MBMS bearer service and the E-UTRAN eMBMS bearer service would have 2 different TMGIs.

The reference architecture of MBMS is as shown in FIG. 2. Here, Multi-Cell/Multicast Coordination Entity (MCE) could be a functional entity which could be either stand-alone node or a part of another network node (e.g. eNB as shown in FIG. 3 (b)). The MCE takes care of admission control, counting results of MBMS services, and resumption or suspension of MBMS sessions depending in the counting results. The M3 reference point is specified for the control plane between MME and E-UTRAN, assuming that the MCE is a part of the E-UTRAN. The details of the (e)MBMS reference points and related functional entities can be found in the above mentioned standard document [2].

Two possible deployment alternatives that are considered in [2] are shown in FIG. 3, with additional consideration of an X2 interface between eNBs for the present invention. Currently, the services which are envisioned to be provisioned using MBMS are streaming of audio and video, updates of smartphone applications, etc. (as outlined in [1]). It is also considered that the regions where these services are to be delivered will be pre-planned and service continuity over the MBSFN area is enabled by using careful prior planning of the network. The service continuity is enabled as the MBMS service data is delivered in the same radio resources in the cells participating in the MBSFN area. In the boundary area of two cells, the UE can combine the signals coming from the two cells, and therefore, the probability of correct reception is increased. The detailed physical layer parameter configurations for the MBMS feature are available in 3GPP TS 36.331, "E-UTRA: RRC Protocol Specification," v 11.2.0, briefly denoted [3] hereinafter). Some of the key features of Multicast Channel (MCH) defined in [2, 3] are the requirement to be broadcast in the entire coverage area of the cell, support for MBSFN combining of MBMS transmission on multiple cells, and support for semi-static resource allocation e.g. with a time frame of a long cyclic prefix. The mapping of downlink transport and physical channels are as shown in FIG. 4.

Here, the MBMS control information is conveyed using MCCH logical channel and user data using MTCH logical channel which can be used for multiple MBMS services within an MBSFN area. For simplicity we refer to the multicast transmission over the Core network and over the Radio Access Network (RAN) as point-to-multipoint (P2M) bearer. More specifically, the P2M bearer uses the mechanisms specified in 3GPP for transmission of data from BM-SC to UE.

Mobility aspects of UEs moving out from a MBSFN area to other neighboring cells where the MBMS service is broadcasted/multicasted on different radio resources, but still service continuity is expected has not been considered yet. The reason for this is that current MBMS applications are mainly streaming applications and short interruption perceived by the user is not critical. However, for new services, e.g. as currently studied in 3GPP is ongoing related to Group Communication System Enablers for LTE (GC-SE_LTE) (see, for reference 3GPP TS 22.468, "Group Communication System Enablers for LTE: (GCSE_LTE) Release 12," ver 0.3.0), radio resource efficiency via MBMS transmission and service continuity are key features. Key criteria for radio resource efficiency is "to avoid duplicated/unnecessary radio resources allocated for different group members in a certain cell" and "to minimize impact on signaling plane for the network". If many UEs are located in the same area, then MBMS is considered as one of the potential technologies to achieve this resource efficiency when transmitting Group Communication (GC) service data (see, for reference S2-131509, "Architecture & functional requirements for GCSE_LTE," Qualcomm Incorporated). In cells where there are only few UEs, the network may decide to distribute the GC service data in unicast way.

SUMMARY

In an embodiment, the present invention provides a user equipment (UE) for providing service continuity when the UE is about to move out of coverage of a corresponding Multimedia Broadcast Multicast Service (MBMS), the UE being configured to: receive MBMS related data, as part of a group communications service, via an MBMS bearer; detect that the UE is suffering from a bad MBMS bearer condition for the corresponding MBMS service; inform a server of the bad MBMS conditions to initiate switching to establish unicast transmission; wherein, if there is downlink data to deliver during switching, the UE is configured to begin to receive the downlink data via unicast and to continue to receive downlink data via the MBMS bearer until the switching to establish a unicast bearer is complete; and ceasing to receive the downlink data via the MBMS bearer and continuing to receive data via the unicast bearer. The UE is configured to determine a quality of the MBMS bearer relative to a threshold for indicating that the MBMS bearer quality is not acceptable. When the threshold is reached the UE is configured to send a message to the server accordingly. The threshold used to indicate MBMS bearer quality is dependent on the service type.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
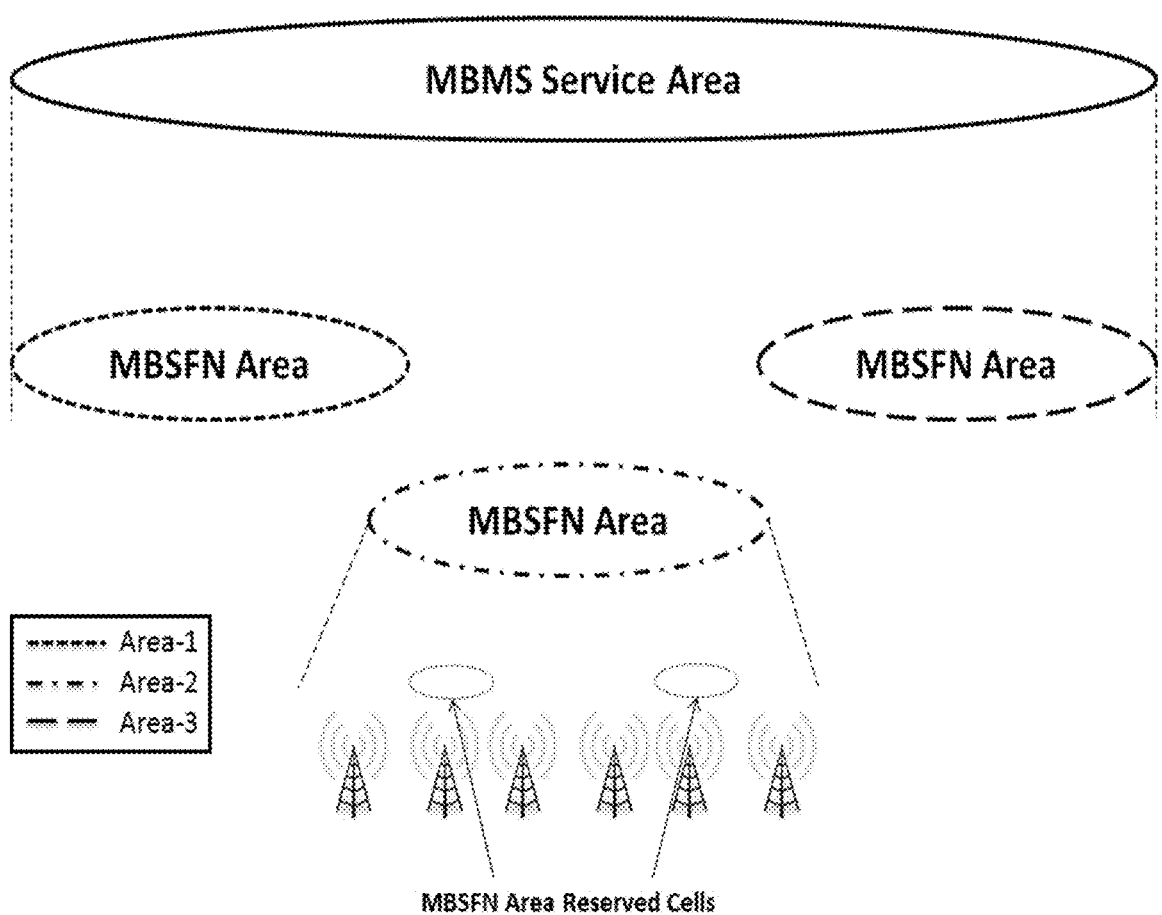
FIG. 1 is a schematic view illustrating the general concept of MBMS service provisioning according to the prior art.
Figure 2:
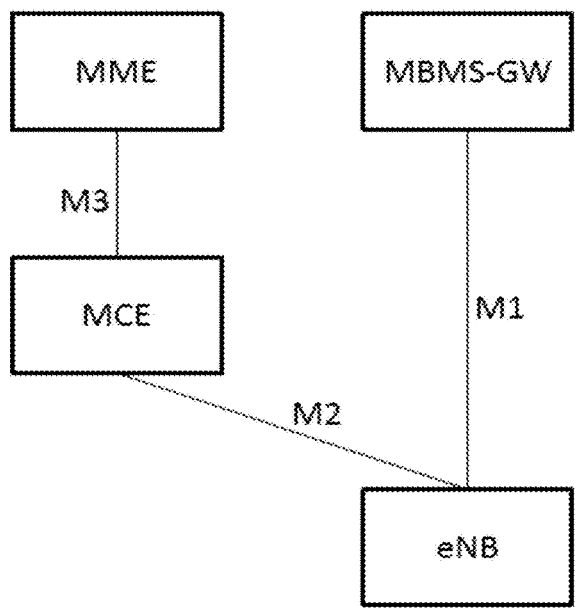
FIG. 2 is a schematic view illustrating the eMBMS reference architecture according to the prior art.
Figure 4:
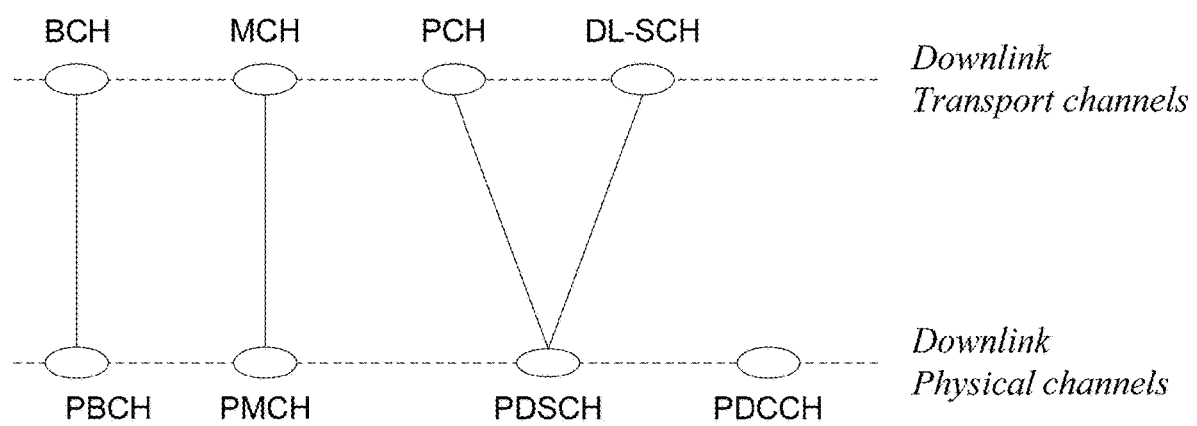
FIG. 4 is a schematic view illustrating channel mapping employed in connection with MBMS according to the prior art.
Figure 3:
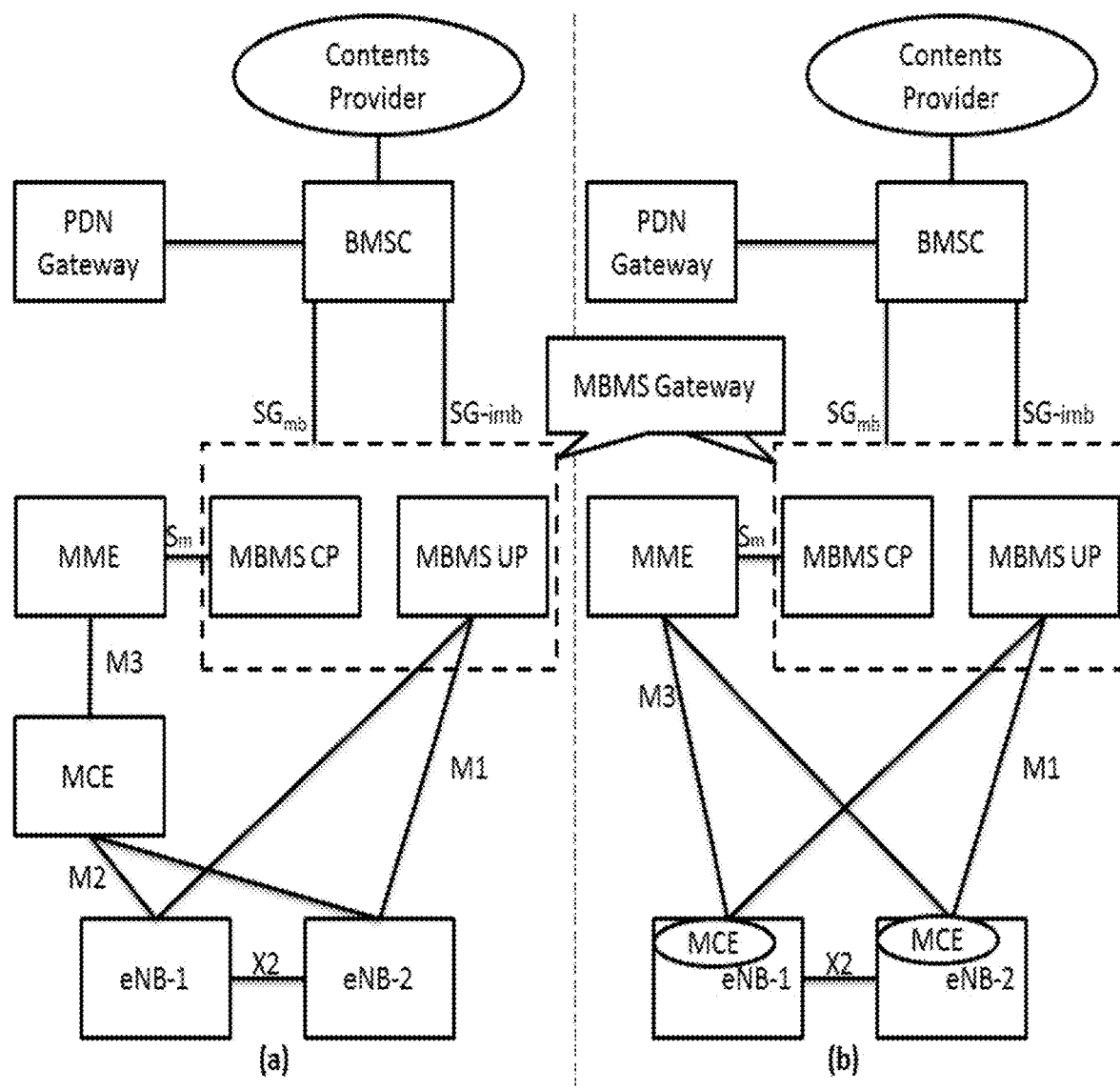
FIG. 3 is a schematic view illustrating eMBMS deployment alternatives according to the prior art.

An embodiment of the present invention provides a method for providing multicast/broadcast service continuity for mobile terminals in a radio access network of the initially described type in such a way that MBMS reception losses experienced by the mobile terminal/UE, in particular when reaching cell edges, are effectively prevented, thereby avoiding the above disadvantages.

In accordance with an embodiment of the invention, a method is characterized in that a mobile terminal performs multicast/broadcast service related radio measurements and that a decision on actions to be performed by said base station and/or by said mobile terminal for preserving reliable transmission/reception of said multicast/broadcast service related data to/by said mobile terminal is taken based on the results of said multicast/broadcast service related radio measurements.

An embodiment of the invention provides a base station configured to receive results of multicast/broadcast service related radio measurements performed by a mobile terminal and, based on the received measurement results, to take a decision on actions to be performed for preserving reliable transmission of said multicast/broadcast service related data to said mobile terminal.

An embodiment of the invention provides a mobile terminal configured to perform multicast/broadcast service related radio measurements and to take a decision on actions to be performed for preserving reliable reception of said multicast/broadcast service related data based on the results of said multicast/broadcast service related radio measurements.

Embodiments of the present invention as described below deal with disadvantages of possible solutions mentioned above. An embodiment of the present invention is based on network-initiated measures to provide service continuity. The described embodiments aim also to meet the system requirements as per document 3GPP TS 22.468, "Group Communication System Enablers for LTE: (GCSE_LTE) Release 12," ver 0.3.0, where it is specified that "When UEs are moving among cells during group communication, service continuity shall be supported".

An embodiment of the present invention is based on the UE-assisted reporting of MBMS-related radio quality conditions (MBMS-related radio measurements) to the radio network node (eNB), and the radio network (eNB) takes a decision how to provide the reliable transmission of the MBMS data to the UE. The UE's current/existing radio measurements (used for the mobility procedure) may be extended to additionally include information about the MBMS radio signal quality. After receiving the extended measurement reports from the UE, the eNB may decide based on MBMS service topology (e.g. if the MBMS service, both MBSFN or non-MBSFN, is configured in the neighboring cells or if unicast transmission conditions are possible) which actions to perform in order to guarantee the service continuity of the MBMS service reception in the UE.

The MBMS-related information (MRB reporting) in the measurement reports from UE to eNB can be e.g. MRB signal strength (similar to the signal strength of pilot signal as reported currently in measurement report), or decoding error of received MRB data, or block error rate of received MRB data and other possible physical layer, MAC layer or RLC layer parameters. For example, if MBSFN is configured, there is an MBSFN carrier symbol within the transmission frame as described in [2] (3GPP TS 36.300, section 5.1.4). This MBSFN carrier symbol can be used as referenced signal to generate the MBMS-related information in the UE's measurement reports.

Generally, the term "MBMS" as employed in the art implies "multimedia service" which is not necessarily true when the multicast/broadcast service contains public safety services or any other service data. Therefore, in the context of the present invention the term "MBMS" (including the derived forms "MBMS transmission", "MBMS cell boarder" or "MBMS data") is used equivalent to Multicast/Broadcast-Radio (MB-R) or multicast radio bearer (MRB, as analogy to unicast DRB). In this sense the terms MRB transmission and MRB cell border can be used interchangeably with MBMS transmission, etc.

One or more embodiments of the present invention provide:
1) A RAN node (eNB) able to 1) determine whether to configure a UE for measurement reporting for MBMS/MRB-related information and 2) is able to gather information from neighbor cells about their MBMS transmission resources/conditions.
2) A RAN node (eNB) able to decide based on the measurement reports from a particular UE whether to start transmitting the MBMS data over unicast DRB to this particular UE. Further the eNB is able to decide whether to apply different scheduling priorities for MBMS and non-MBMS data over the same unicast DRB.
3) A RAN node able to determine signal thresholds for the UE and to configure the UE with these thresholds in order to enable the UE to perform, only when needed, the actions for the switch from multicast to unicast delivery of group session data.

In summary, multiple embodiments of the present invention describe several flavors of the solution for the problem of providing service continuity. Currently there are no mechanisms that enable a service continuity of broadcast/multicast service(s) when the UE leaves an area of the (e)MBMS transmission coverage, but is still in cell coverage for unicast transmission. Compared to prior arts and the possible solutions described above, solutions according to embodiments of the present invention provide the benefits of 1) service continuity, i.e. no data flow interruption is perceived by the application layer receiving the MBMS data and 2) the switch from multicast to unicast delivery only if needed (i.e. not too early when the switch can be avoided or not too late when the connection is disrupted).

Hereinafter, before describing embodiments of the present invention, the general problem underlying the present invention is described in detail with reference to FIG. 5.

Figure 5:
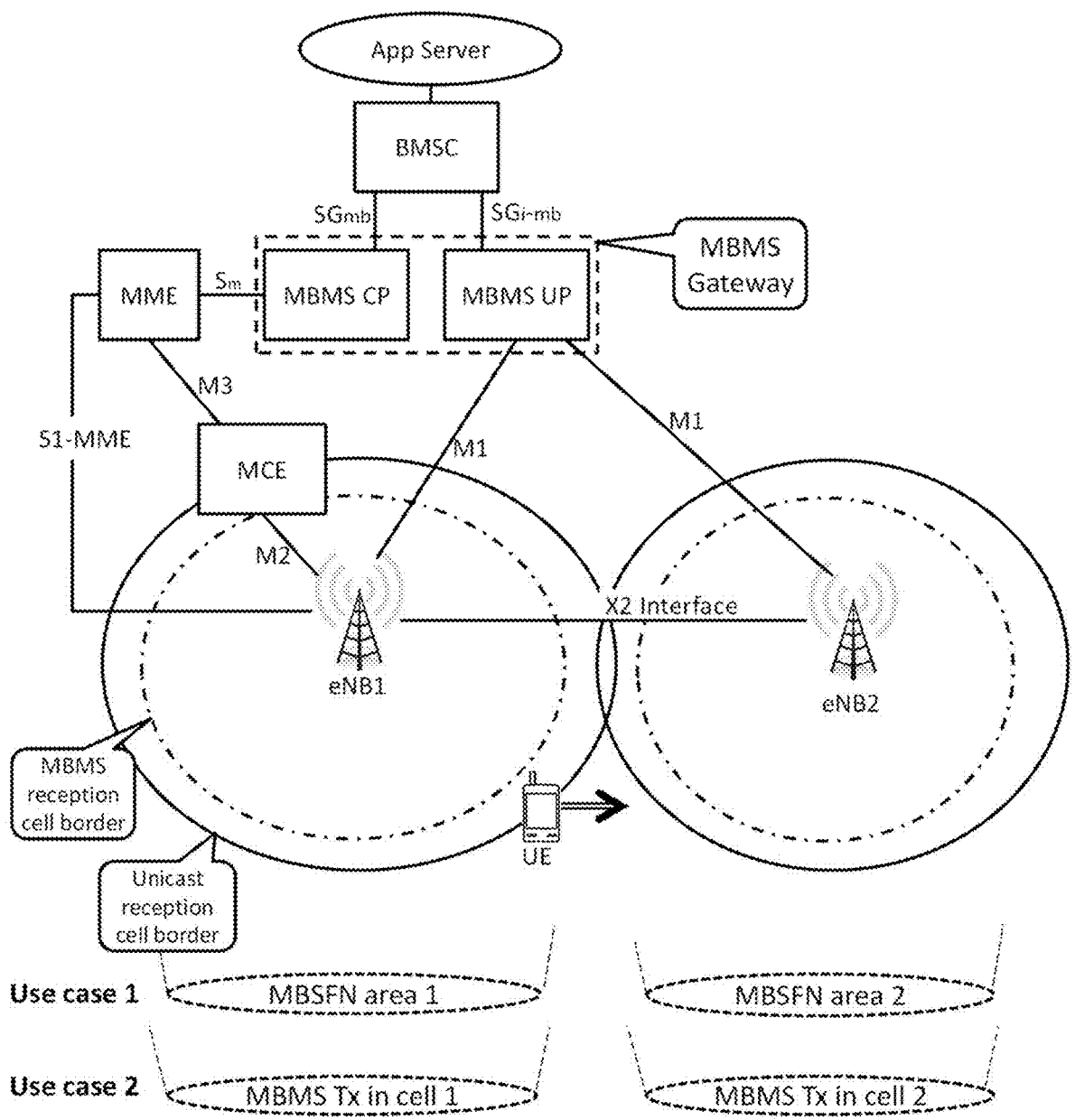
FIG. 5 is a schematic view illustrating a communication system according to an embodiment with possible coverage areas during MBMS reception.

Considering a scenario in a communication system as shown in FIG. 5, two base stations—denoted eNB1 and eNB2—are part of the same MBMS service bearer. As the eNBs transmit the MBMS data over the MRB with the same signal strength and on the same frequency (sub-carrier) for the whole cell, it may happen that the eNB transmit the MRB data with less power strength than the possible maximum power strength used for unicast DRBs in order to keep the interference to neighbor sub-carriers low. Another reason for different coverage areas of MBMS (MRB) transmissions on the one hand and unicast transmissions on the other hand is the fact that the frequency sub-carriers configured for MRB transmission (which cannot be chosen flexibly due to, e.g., MBSFN area configuration) can have worse propagation conditions compared to the dynamic use of sub-carriers for unicast transmission. Due to this fact, the cell coverage (or cell border) for MRB transmission may be smaller than the cell coverage (cell border) for unicast DRBs. In FIG. 5, the MRB transmission cell border is shown by interrupted lines, whereas the unicast transmission cell border is shown with solid lines. In such situation, when a mobile terminal—denoted UE in FIG. 5—is moving to the cell border as shown in FIG. 5, the UE may not be able to correctly receive MRB transmission while the unicast DRB data can be still received correctly. The consequence is that the UE is not able to receive the MBMS data in the cell border, and therefore, the service continuity for the applications receiving the MBMS data is not provided.

At the bottom of FIG. 5 two use cases are shows in which the above problem can happen:

Use case 1: the cells of eNB1 and eNB2 are part of the same MBMS service bearer, but the cell of eNB1 is part of a different MBSFN area than the cell of eNB2.

Use case 2: the cells of eNB1 and eNB2 are part of the same MBMS service bearer, however, eNB1 and eNB2 are not configured with MBSFN.

In both cases, when a UE is moving to the edge of the eNB1 cell or the eNB2 cell, and the UE is receiving the MBMS bearer service, the UE would lose the MBMS reception in eNB1 cell and in eNB2 cell, even before reaching the cell borders for handover conditions. For the time duration when the UE is located between the borders of the 'MBMS cell reception borders' of eNB1 and eNB2 cells, the UE would not have MBMS reception.

Even in the case when the 'MBMS reception cell border' and 'unicast reception cell border' are nearly overlapping, service continuity is not provided, as the UE needs to find out and synchronize to the MBMS radio resources of the target cell.

To put the problem in other words, the MBMS service area (MBMS/MRB coverage) within the cell is smaller than cell coverage for unicast transmissions, and therefore, the UE would lose MBMS reception before reaching cell edge as defined for the handover conditions.

Current state-of-the-art technologies can provide retransmission of MBMS data from the BM-SC to the UE, e.g. as described in File Delivery over Unidirectional Transport (FLUTE) protocol in IETF RFC 3926 (pre-FEC repair Quality of Experience (QoE) metrics report to allow operator to optimize FEC configuration of FLUTE). Another state-of-the-art solution is described in section 8.5 in 3GPP TS 26.346 for using MBMS streaming delivery on unicast delivery. The retransmission can be performed over a unicast EPS bearer.

The disadvantages of these state-of-the-art solutions are due to the fact that they rely on the application level or service level mechanisms. If the application or service layer notice packet losses and initiate actions for service recovery, some packets can be lost already, which does not guarantee loss-free data reception of application data sent over MBMS service bearer.

Another mechanism for MBMS service continuity is described in document [2] (TS 36.300, section 15.4). The specification describes that service continuity is provided when the UE moves within the same MBSFN area. For this purpose the UE in IDLE state can change the prioritization of frequencies in order to keep the reception of the MBMS service in the MBSFN area. A UE in CONNECTED state may indicate its preference in receiving MBMS service compared to unicast reception and the eNB can decide whether and how to map/schedule the frequencies for unicast transmission in order to keep the MBMS service reception.

However, the problem outlined above (i.e. MBMS/MRB coverage within the cell is smaller than cell coverage for unicast transmissions) is not solved by the above described state-of-the art. Service interruption can still happen when the UE leaves the MBSFN area until the UE configures the reception of the MBMS service in the target cell and also depending on the MRB coverage of the MBMS frequencies used in the source and target cells.

One possible solution to solve the problem outlined above is based on UE-initiated and triggered actions on the application layer from UE to the Application Server. The UE can request the unicast transmission of the received service from the Application Server upon detection of service disruption via MBMS reception. For example, the UE's application layer can detect the loss of data packets or frequent request for packet retransmission. This detection can be used as trigger for the UE's application to request via application level signaling to the Application Server (e.g. Public Safety Application Server or any other server which generates the data sent over MBMS bearer service in the 3GPP network) the transmission of the service data via unicast delivery. With other words, this is an application layer based detection of service disruption and according application layer initiated signaling to application server to request appropriate actions (e.g. unicast transmission of data) to preserve service continuity.

Another alternative of the possible solution for UE-initiated signaling to the application server is that the 3GPP layers (access stratum or non-access stratum implementations) in the UE (instead of the application layer) detect that the (e)MBMS data cannot be received correctly, e.g. cannot be demodulated or decoded correctly at the 3GPP's physical, MAC or PDCP layers after reception. Then, the 3GPP layers indicate to the Application layer the loss of service, so that the Application layer can take the needed actions. In particular, the Application layer requests from the GC-AS (via application layer signaling) unicast transmission of the GC session data. After the Application layer in the UE is aware about the MBMS service/data loss, the Application initiates the application level signaling.

However, there are several disadvantages of such solution. One disadvantage is that the time duration between the detection of MBMS data loss and re-establishing of the service data reception in a unicast delivery manner (using existing or a new established EPS bearer) depends on the UE implementation, network and service provider conditions. This time duration may be considerable, and thus, obviously, no service continuity is provided. Therefore, reliable solutions are needed to assure service continuity.

Figure 6:
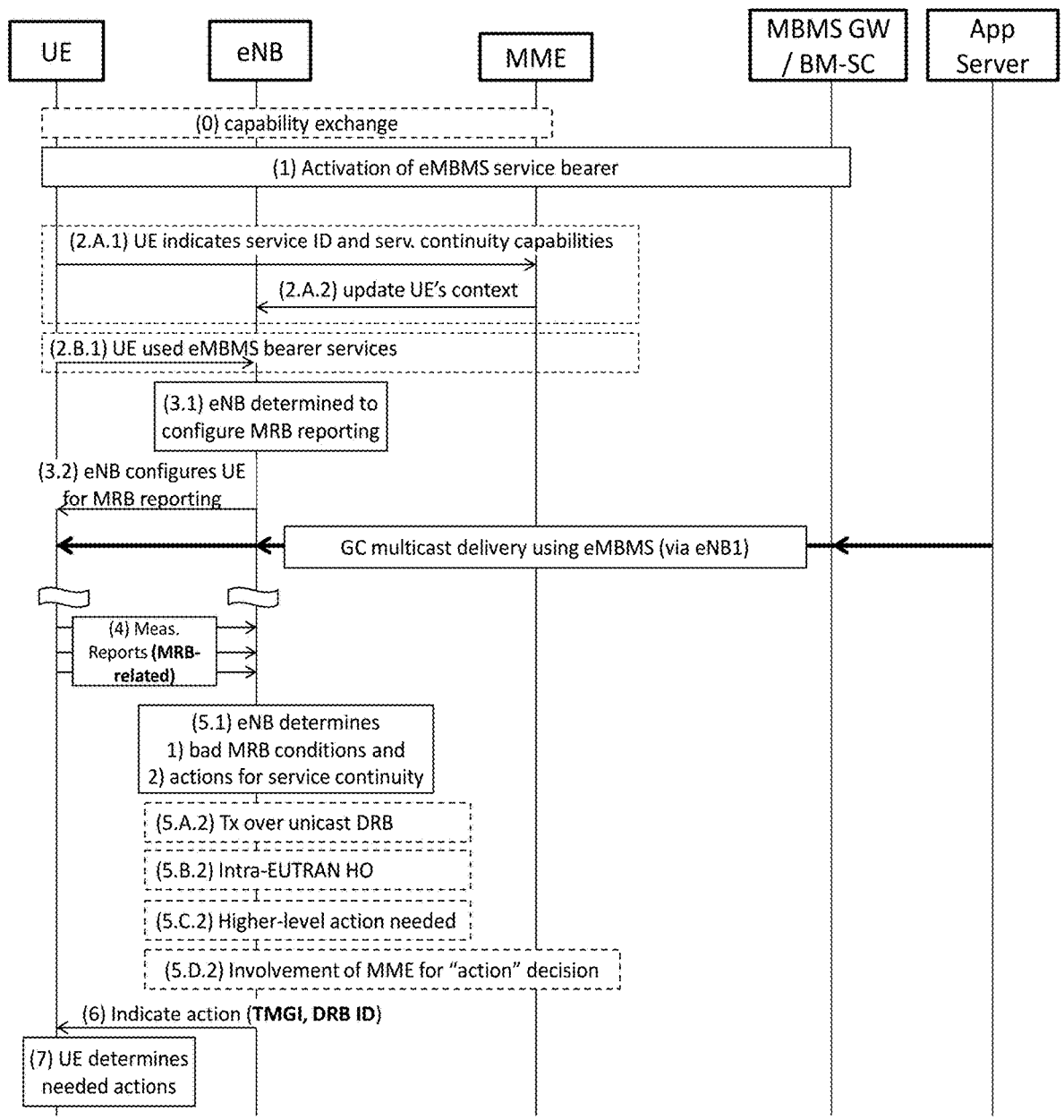
FIG. 6 is a signaling diagram of a mobile terminal's MBMS-related reporting in accordance with an embodiment the present invention.

Turning now to FIG. 6, this figure illustrates a scenario together with the corresponding signaling flow in accordance with a particularly preferred embodiment of the present invention. According to this embodiment, configuration procedure(s) for the mobile terminal (UE), RAN and core network (C-plane, e.g. MME) are carried out in the beginning in order to setup the conditions which allow to perform the solution. The configuration procedures include steps (1), (2) and (3), as shown in FIG. 6.

The main part of the illustrated embodiment is based on the entity located in the RAN, preferably it is an eNB, denoted eNB in FIG. 6, which takes care about the service continuity. Based on radio reports sent by the UE the eNB determines that MBMS service is about to be interrupted due to bad radio conditions. Consequently, the eNB determines what actions to perform in order to guarantee the service continuity of the MBMS data. The enhanced eNB functionality is shown in steps (5) and (6). Correspondingly, the UE needs to be extended with functionality to perform procedures conformant to the action(s) decided by the eNB for service continuity.

The text with bold font in the messages in steps (4) and (6) of FIG. 6 shows possible extensions to the current/existing signaling.

The detailed explanation of the embodiment illustrated in FIG. 6 is given as follows:

During the optional step (0) the UE exchanges capabilities about support of (e)MBMS bearer service continuity. This capability exchange may happen either (a) during an Attach procedure, e.g. the UE includes the capability as part of the Attach request message, or (b) when the UE starts receiving (e)MBMS bearer services as an explicit NAS signaling exchange between UE and MME or RRC signaling between UE and serving eNB.

In step (1), the UE activates the reception of MBMS bearer service, which can be the GC data/media via a multicast delivery from the content provider (GC-AS) via an (e)MBMS bearer service. This step (1) includes signaling between UE, MME, and MBMS-related entities in the core network, e.g. MBMS gateway (MBMS GW) and/or BM-SC, as the purpose is to join to the already established MBMS bearer service.

In step (2), after the UE starts receiving (e)MBMS bearer service(s), the UE updates either the MME or the eNB or both about the current actively received eMBMS bearer service(s). For example the UE, or the MME, or both can indicate to eNB the TMGI(s) corresponding to the (e)MBMS bearer service(s). The indication can include the type of MBMS service, i.e. whether service continuity for this MBMS bearer (for the given UE or general for all UEs receiving this MBMS bearer) is needed or not. Further, the indication can provide information about the priority of the MBMS service compared to unicast DRB reception. With respect to step (2), two different embodiments—denoted by A and B in FIG. 6—are envisioned on how information related to the UE's currently received MBMS service can be updated to the eNB or MME. These two embodiments are described as follows:

Option A:

In step (2.A.1), the UE may indicate to the MME the successful joining to the MBMS bearer services (i.e. after successful reception of the MBMS data). This step can be performed optionally if the UE is configured to perform it. The configuration of the UE can be performed e.g. during step (0) described above or during any other NAS procedures as attach or TAU procedures. If the MME can become aware about the successful joining of the MBMS bearer service, then step (2.A.1) may be omitted and the MME can proceed with next step (2.A.2).

In step (2.A.2), after the MME is informed about the successful start of MBMS data reception by the UE (or joining the MBMS bearer service), MME updates its own UE's context, and further, performs UE's context update in the current eNB. This update to the eNB can include MBMS bearer service ID (e.g. TMGI), specific UE priorities (ARP) for the MBMS bearer service compared to other UE's unicast bearer(s) and other parameters.

Option B:

Alternatively, in step (2.B.1), the UE can indicate to the eNB the activated reception of the MBMS bearer service (i.e. joining the MBMS bearer or start of successful reception of MBMS data). Exemplary an RRC signaling can be used to exchange this indication between UE and eNB. The indication can include the MBMS bearer service ID (e.g. TMGI), specific UE priorities (ARP) for the MBMS bearer service compared to other UE's unicast bearer(s) and other parameters.

In step (3.1), after the eNB has been updated about the activated UE's MBMS bearer reception, the eNB determines whether the UE should be configured to include in its radio measurement reports also information about the quality of the MRB reception (or MBMS radio signal quality). It should be noted that the measurement reports are currently used as tool for the RAN to know whether handover procedure should be initiated, or to estimate the signal power for radio transmission. If the UE has activated multiple MBMS bearers, then the eNB should determine whether to activate the measurement reporting per MBMS bearer. With other words, for one MBMS bearer the reporting may be activated, but for other one it may not be activated. The eNB can use the priority or other criteria (e.g. other QoS parameters like QCI, ARP or type of service over MBMS) of the MBMS bearer service in order to determine whether to activate the MRB/MBMS measurement reporting for a given bearer in the UE. Also, the UE can indicate during step (2.A.1) or (2.B.1) whether service continuity for a particular MBMS/MRB bearer is needed.

The eNB can determine whether the current UE measurement reporting should be changed, e.g. from "event-based" reporting to "periodic" reporting, or vice-versa from "periodic" to "event-based" reporting. Further, it is possible to configure the MBMS measurement reporting independently from the measurement reporting configured for handover procedure.

The eNB may have knowledge about the MBMS service transmission in the neighbor cells, e.g. in which radio resources (frequencies) the MBMS/MRB is transmitted. If such information is available, the eNB can configure the UE with those MBMS resources in the neighbor cells, so that the UE can perform also MRB measurements for the neighbor cells similar to the (unicast) radio measurements for mobility.

In step (3.2) the eNB instructs the UE about the radio measurements including the MRB reporting. The MRB reporting can be configured for one or multiple of the currently received MBMS services. Further the MRB reporting can be performed also for neighbor cells. This instruction can be performed as an existing or new RRC signaling message, e.g. as reply to step (2.B.1), if option B from step (2) has been used. For example, the eNB can use RRCConnectionReconfiguration message with extensions to the mobilityControlInformation or a new information e.g. called MBMSControlInformation. The UE can be configured to stay in CONNECTED state due to the MRB reporting. Depending on the MRB reporting frequency and on the QoS requirements for the activated DRB(s) in parallel in the uplink, the UE may be configured with long DRX in order to save uplink resources. Event-based MRB reporting is also possible, as will be described in detail below in connection with FIG. 8.

In step (4), the UE sends enhanced radio measurement reports including MRB/MBMS-related radio signal reports to the eNB. After the instruction from the eNB in the step (3.2), the UE needs to re-configure its radio interface to start gathering MRB radio information similar to the unicast radio information measurements performed for the mobility/handover procedure. This MRB/MBMS reporting can be a part of the current UE's measurement reports to the eNB, or it can be a separate reporting. Currently, the measurements reports are sent over RRC signaling (RRC "MEASUREMENT REPORT" message from UE to eNB), so that it is preferable to extend this existing RRC signaling from UE to eNB to include MRB/MBMS reporting. Further details about the UE reporting will be described below in connection with FIG. 8.

In step (5.1) the eNB determines the UE's reception quality of the MRB bearer (MBMS data) based on the measurement reports received in step (4). If the eNB determines that data loss of MRB connectivity is possible due to bad radio conditions, the eNB takes measures to preserve the service continuity for this MBMS bearer. It should be noted that for one MBMS bearer the radio conditions may be bad, whereas for other MBMS bearer or unicast bearer(s) received by the same UE the radio conditions can be still good. The eNB determines whether to provide service continuity for the given MBMS bearer with bad radio conditions based on the MBMS bearer type (i.e. importance, QoS parameters or kind of service) configuration during step (2), including the options A or B described above, and step (3.1).

If service continuity to the UE for the MBMS bearer should be provided, the eNB shall determine which actions can be performed in order to assure the service continuity. This is generally shown as step (5.2) in FIG. 6. The eNB takes into consideration the MBMS transmission in the neighbor cell(s) according to the measurement report from step (4), but also the unicast bearer radio conditions. The eNB can take one or more of the following optional actions:

Option A: In step (5.A.2), the eNB decides to send MBMS data to UE via unicast DRB. This mapping of MBMS data to unicast DRB could be done as long as handover to a neighbor cell happens (where the UE can continue with the MBMS/MRB reception) or UE returns to better MBMS/MRB radio conditions in the same cell. How to map MBMS data to unicast DRB is explained in detail below, in particular in connection with FIG. 7. The indication to the UE is described in step (6).

Option B: In step (5.B.2), the eNB initiates handover (HO) to a neighbor eNB, which is configured with the same MBMS service and where the MBMS/MRB-related corresponding measurement reports have better quality than in the current cell. The option B is possible if the UE is configured with measurements for MBMS/MRB transmission resource(s) in the neighbor cells, as described in step (3.1).

A problem can occur if the non-MBMS/non-MRB measurements (i.e. normal radio measurements for mobility procedure) do not indicate to eNB a need for handover, however the MBM/MRB measurements indicate to eNB that handover is required (or may be helpful). In such a case, the eNB should decide according to the priority of MBMS and unicast services, i.e. if MBMS service(s) has higher priority, then the eNB should decide to perform handover to the neighbor cell, although the normal (unicast, non-MBMS) measurements do not indicate handover. However, the eNB can determine to apply option A from above, i.e. temporary transmission of the MBMS data over unicast DRB bearer, if the normal (non-MBMS, unicast) mobility measurements indicate that handover procedure is not required and/or the unicast transmission has higher priority than the MRB transmission.

Option C: This option, shown in step (5.C.2), is applicable in scenarios where the UE is close to the cell border to another target cell, which is not part of the MBMS service. With other words, the UE is going to leave the MBMS service area soon. As the MBMS data cannot be received in the neighbor cell anyway, the eNB may decide to trigger the UE to send an application level request for unicast delivery. Alternatively, the eNB may simply indicate to the UE that MBMS service continuity cannot be provided by the RAN. This is shown in detail in FIG. 9.

Option D: This option, shown in step (5.D.2), involves the MME in the decision process for the "action" to be taken for service continuity. For example, after the eNB determines the bad radio conditions for MBMS/MRB transmission for the given UE in step (5.1), the eNB indicates to the MME that the MBMS/MRB reception for the UE is going to be interrupted (or lost). Then the MME can take actions to avoid this interruption. One possible action would be that the MME informs the UE (e.g. via NAS signaling) about the MBMS/MRB reception loss, so that the UE's NAS layer can inform the application layer to take application layer measures to keep the service continuity. The indication from MME to UE can use an existing or a new NAS message and can contain the TMGI of the MBMS service. It should be noted that the indication from MME to UE is not shown in FIG. 6. Further, it should be noted that the signaling between eNB and MME involves the M2 and M3 interfaces and possible the MCE entity. This eNB-MME signaling needs to be extended to allow the indication of the new determination of bad MBMS/MRB radio conditions for a given UE.

Option D can be applied as alternative for signaling exchange from eNB→MME→UE to all options A, B, C or other possible options.

According to another alternative embodiment for option D the MME initiates or allows a bearer modification procedure for the DRB only (not the whole EPS bearer) as described in step (5.A.2) above. This can be signaled from MME to eNB, so that the eNB can proceed further with step (6).

In step (6) the eNB indicates the determined action to the UE. This step can be done for all options for which the "action" for service continuity is decided in the eNB, as shown in steps (5.A.2), (5.D.2) and (5.C.2). The indication from the eNB to the UE can be included in an existing or a new RRC message. The content of the indication depends on the determined action in step (5.2). If eNB determines to apply option B from step (5.2), then no indication is needed.

If the determined action is Option A from step (5.2) then the eNB indicates to the UE that the MBMS service will be temporarily delivered over a particular unicast DRB. For example, the indication can contain: 1) the MBMS service ID (e.g. TMGI, which the eNB stores in the UE's context as described in steps (1), (2) or (3)); and/or 2) the unicast bearer ID (DRB ID or EPS bearer ID), and/or 3) modified RRC connection parameters (e.g. DRX parameters, Inactivity timer); etc. Additionally or merely the indication can contain information to the UE that the MBMS data is going to be transmitted over DRB, so that the UE does not need to perform any MBMS-related signaling/actions due to bad MBMS/MRB reception. With other words the UE may temporarily ignore the reception of the MBMS data over MRB.

If eNB determined to apply option C from step (5.2), further details about step (6) are described below in connection with FIG. 9.

In step (7) the UE takes the actions according to the indication in step (6). In case of Option A from step (5.2), further details about step (7) are described below in connection with FIG. 7. In case of option C from step (5.2), further details about step (7) are described below in connection with FIG. 9.

Specifically in case of options C and D, the UE receives the indication from the eNB e.g. via RRC signaling, however the actions to be performed by the UE are on higher layers. Therefore, it is required that the UE implements ability (e.g. internal means or internal interfaces) in order to convey the information obtained in lower layer to the corresponding upper layer or software module. For example, in case of option C, if the eNB indicates that Application layer signaling is needed to request for unicast delivery, the UE needs first to implement means to understand this information and to derive the required action, to derive the concerned application, and also means to internally convey this information to the concerned application. It is also possible that the UE implements a kind of dispatcher software/layer/module, so that e.g. the RRC layer sends the indication to the dispatcher software/layer/module, which in turn determines the impacted/concerned application.

Yet another embodiment for step (5.2), which is not depicted in FIG. 6, is that the eNB can increase the MRB signal strength according to the received MRB measurement report, so that the MBMS data is received with higher quality at the UE. Optionally in addition or alternatively the eNB can modify the modulation and coding scheme (MCS) to increase the robustness of the MRB data transmission. However, in this case the problem may arise that the throughput may not be sufficient. As a solution, based on the MRB QoS parameters, the eNB may decide to schedule the MRB transmission more frequently. Here, possible limitations of the MRB scheduling might occur.

If the current eNB cell and the close neighbor eNB cell(s) are part of the same MBSFN area, then the above solution option of increasing the signal strength would be reasonable as this would allow the UE to combine the MBMS/MRB signals from both cells and to achieve correct reception.

It should be noted that currently the eNB processes the UE's measurement reports as part of the mobility procedure, i.e. to decide whether a handover procedure to neighbor cell should be performed. However, the MBMS/MRB-related information in the extended measurement reports, as proposed in accordance with embodiments of the present invention, is processed by the eNB for providing service continuity (i.e. not for mobility procedure). With other words the MBMS/MRB-related information in the extended measurement reports is used for a new "MBMS service continuity" procedure in the eNB.

Figure 7:
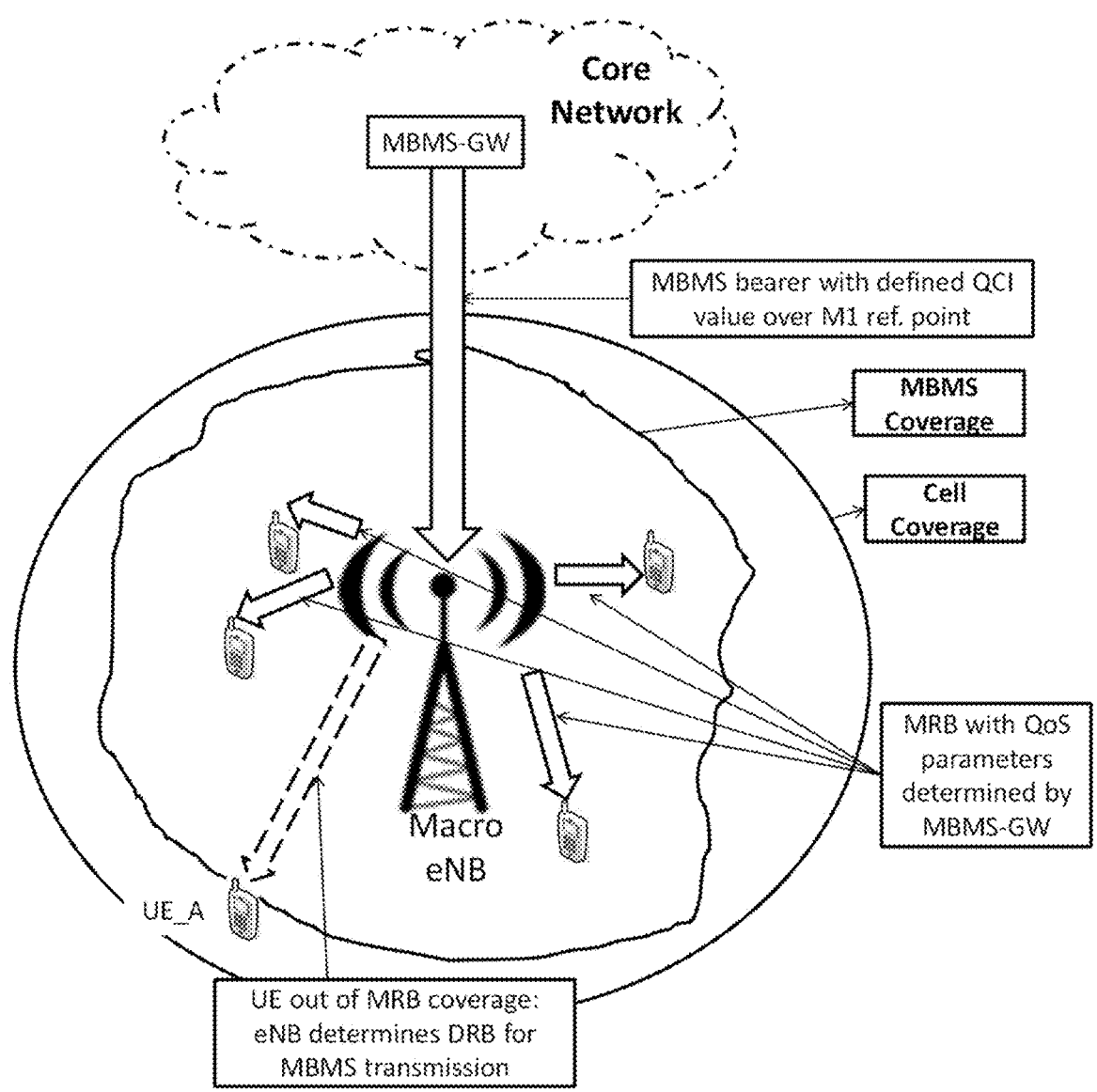
FIG. 7 is a schematic view illustrating a communication system in which service continuity is achieved based on mapping of MBMS data on unicast radio bearer according to an embodiment of the invention.

Turning now to FIG. 7, this figure shows further details about option A of the possible actions determined by the eNB, i.e. step (5.A.2) as described above in connection with the embodiment of FIG. 6.

Specifically, FIG. 7 shows the MBMS data flow (in the downlink). The MBMS-GW sends the data to the eNB via M1 reference point. The eNB maps the MBMS data over a MRB and all UEs that have activated the MBMS bearer reception would receive the MBMS data. However, it is assumed that one of the UEs, denoted UE_A in FIG. 7, has reported bad MRB radio conditions. Therefore, in step (5.1) of FIG. 6, based on the mechanism described in steps (2), (3), (4), the eNB determines to apply unicast transmission of the MBMS data to the UE_A in order to keep the MBMS service continuity. For this purpose the eNB maps the MBMS data on a unicast DRB.

The UE_A can have one or more unicast DRB(s) established simultaneously. The eNB should decide which DRB to use based on the MRB's QoS parameters and the DRB's QoS parameters. However, mapping the MBMS data on GBR DRB may be not a good solution because the service already transmitted over the GBR DRB may be impacted. Therefore, it is advisable to map the MBMS data on non-GBR bearer having the Allocation and retention priority (ARP) value which is same or possibly similar to the MRB's ARP. The eNB copies/multiplies the MBMS data that is sent over the MRB to the unicast DRB. The eNB can temporarily change or upgrade the DRB's QoS parameters (QCI, ARP, etc.) to be the same as the MRB's QoS parameters as long as there is no overload or congestion scenario. Such update of the QoS parameters is done locally at the eNB and can be optionally communicated to the UE. The eNB can decide to perform this action based on the MBMS data service importance or based on the UE's preference/importance signaled during steps (1) or (2) of FIG. 6. If overload or congestion scenario happens, the eNB should restore the original DRB's QoS parameters. Whether to restore the original QoS parameters depends on the configuration in the eNB received from UE or MBMS bearer establishment during steps (1) or (2) of FIG. 6.

The determining in the eNB how to transmit the MBMS data to the UE (i.e. whether to change the QoS parameters or not) can be performed internally in the eNB. With other words, eNB does not perform explicit signaling/indication to the UE, but instead internally treats the MBMS packets differently from the data packets coming from the S/P-GW over S1-U interface correspondingly to the DRB selected to MBMS transmission. For example, if MBMS reception has higher priority than the unicast data reception, the eNB can schedule the MBMS data packets with higher priority transmission (similar or same to the QCI used for the original MRB transmission) than the unicast data over the same DRB. The UE is not aware about the different treatment of MBMS and unicast packets in the eNB. This differentiated treatment is possible for the downlink transmission; however, it is not possible for the uplink transmission.

For the transmission of the MBMS data over the DRB, the MBMS data needs to be processed in the eNB according to the processing of the unicast data packets. For example, the eNB needs to perform the PDCP (Packet Data Convergence Protocol) layer, RLC (radio link control) layer and MAC (medium access control) layer processing.

The UE is able to distinguish the MBMS data from the unicast data e.g. based on the destination IP address of the IP packets. The MBMS data packets have multicast IP address, so that the UE is able to forward the MBMS to the correct application even though the packets were transmitted over the unicast DRB. Having this solution, the UE's Application, which receives the MBMS data, would not initiate any application-level signaling or actions to change the reception mode from the App server. The UE ignores the reception of the MBMS data over MRB for the time the UE receives the MBMS data over DRB.

Having the different scheduling treatment of MBMS and non-MBMS data (i.e. to treat the data as from different radio bearers) for the same radio bearer would allow to fulfill the QoS requirements (e.g. different QCI) of the original MRB and unicast transmissions, whereas the optimal usage of radio resources is guaranteed. This would require extensions to the eNB, more particular to the eNB scheduling mechanism and internal marking of packets belonging to the same radio bearer to apply different scheduling. With other words, the eNB is extended to apply sub-division of the packets belonging to the same radio bearer (e.g. can be compared like having one radio bearer with two sub-bearers).

Figure 8:
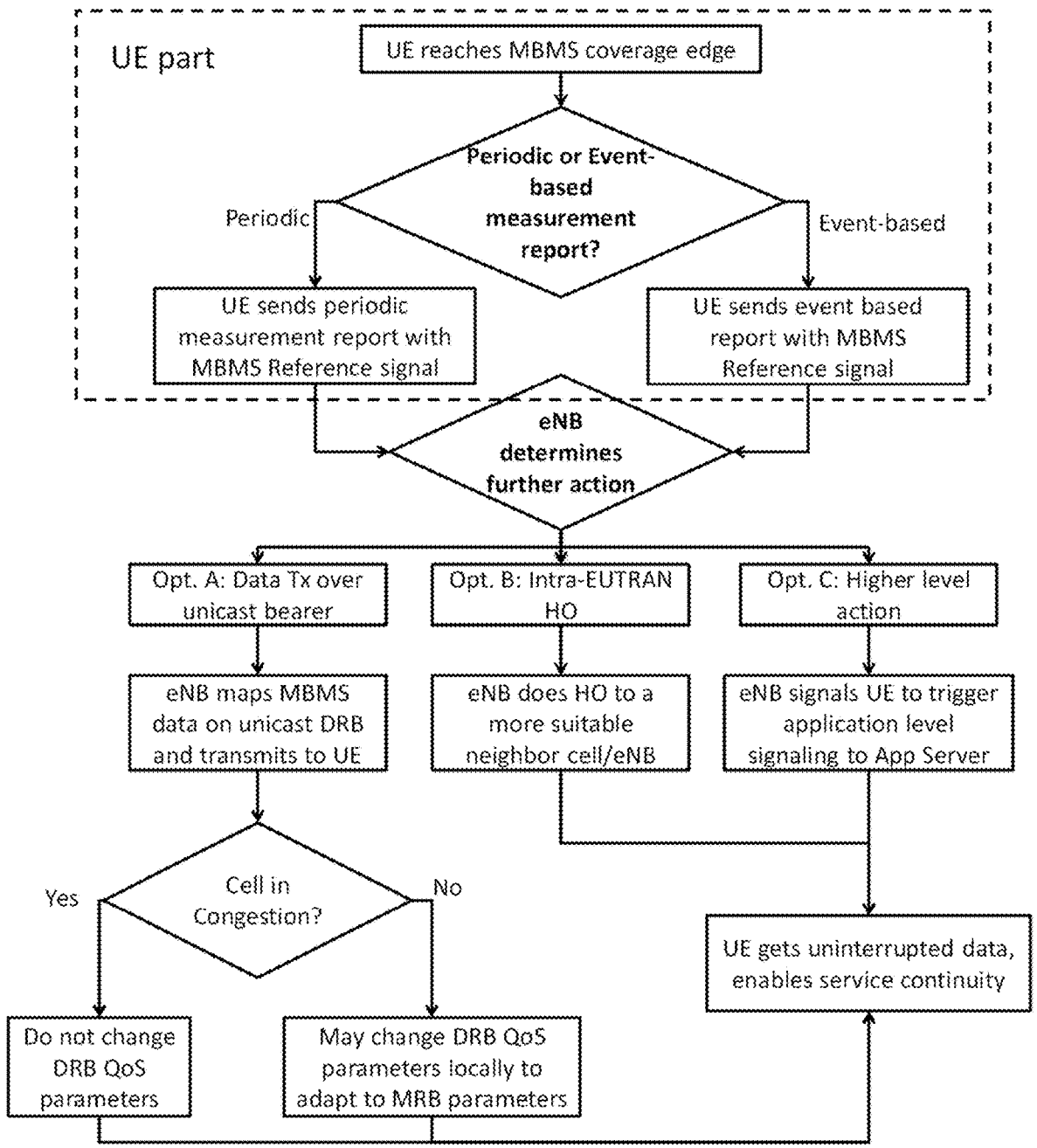
FIG. 8 is a flow chart illustrating reporting and action taking functionalities and procedures for the mobile terminal and the base station according to an embodiment of the invention.

FIG. 8 is a flow chart illustrating both for the UE and the eNB functionalities/procedures for steps (4), (5.1) and (5.A.2), i.e. for Option A from FIG. 6. The upper part of FIG. 8 shows the UE part where the UE reports the radio measurements to the eNB depending on the configuration. If event-based reporting is configured in the UE, then the event can be related to the MBMS&MRB reception only, i.e. independent from the unicast radio measurement for the mobility procedure. In such case the measurement report contains only the MBMS/MRB-related measurements. The "event" for the event-based reporting for the state-of-the-art mobility procedure is defined by thresholds of the signal strength of the current and neighbor cells. For the purpose of even-based triggering for MBMS/MRB transmission, the "event" can be the absolute drop of the signal strength/quality of the MRB signal under a pre-defined threshold. However, if the UE is configured with the information about the MBMS/MRB transmission frequencies (resources) in the neighbor cells, then the UE can apply the state-of-the-art "events" by comparing the MRB signal strength of the current and neighbor cells.

After the eNB receives the UE measurement report(s), the eNB determines whether the MBMS/MRB signal quality is poor. If this is the case, the eNB determines which action to perform as described in step (5.1) from of FIG. 6. FIG. 8 shows only the options A, B and C from step (5.2) in FIG. 6 (i.e. omitting option D). As will be appreciated by those skilled in the art, further options for actions (not shown in FIG. 8) are possible.

Which solution option A, B, C, D or other possible, or combination of the options is to be applied needs to be determined by the eNB. This determination/decision can be influenced by configurations or capabilities during steps (0), (1) or (2). For example it may depend on UE's capabilities, MME's capabilities or eNB's capabilities. Further, as described in the different options in step (5.2) of FIG. 6, the eNB decision can depend on the MBMS/MRB and non-MBMS (normal unicast) measurement reports.

Option A has been described already in more detail in connection with FIG. 7. FIG. 8 depicts the two possible branches of Option A depending on whether eNB cell is in congestion or limited radio resources. If there are enough available radio resources, then eNB can decide, if needed, to locally upgrade the radio DRB in order to adapt the QoS parameters to the MRB's QoS parameters. Otherwise the eNB maps and transmits the MBMS data over the unicast DRB without modification of the DRB bearer.

Since the transmission (or reception, respectively) of the MBMS data over a unicast DRB is meant to be temporal, the UE does not perform MBMS-related signaling with the BM-SC for deregistration, leave, change or other actions for the MBMS session control. The UE continues to perform the MBMS/MRB measurements (additionally to the usual radio measurements for mobility procedures), and thus, the UE continues to send measurement reports (event-based or periodic) to the eNB. The eNB evaluates the measurement reports and determines how to proceed in order to guarantee service continuity. In accordance with embodiments of the present invention, in this case the eNB may decide one of the following actions:

1. The eNB may decide to continue the MBMS transmission over unicast DRB bearer. If the UE continues to experience poor MBMS/MRB transmission conditions and there are no proper neighbor cells, the eNB can keep the mapping of the MBMS data over the unicast DRB for longer time.

2. Alternatively, if the eNB maps the MBMS data over the unicast DRB for some time, there could be a timer-based solution to trigger the UE to contact the Application server to request unicast transmission using application based signaling. The timer can be implemented in the eNB or in the UE. If the timer is implemented in the eNB, then the eNB informs the UE after the timer expirations that the MBMS service cannot be offered any longer over DRB transmission (i.e. the eNB informs the UE to request application layer signaling for service continuity). If the timer is implemented in the UE, then the UE initiates actions upon timer expiration. A possible action can be to initiate application level signaling to request unicast transmission from the App server. After the UE completes action(s) and receives the services reliably over unicast bearer, the UE may inform the eNB and/or MME that the UE no longer receive the MBMS service. With other words the UE deregisters with the eNB and/or with the MME regarding the MBMS service reception. The UE may also deregister for the given MBMS service with the BM-SC.

3. The eNB may resubmit the transmission over the MRB bearer. This is the case if the MRB signal quality improves to such an extent that the UE is able to normally receive the MRB transmission. If the eNB decides that the MRB signal is good enough, the eNB can initiate RRC signaling to inform the UE that the DRB transmission will be terminated and the UE can receive the MBMS service over MBMS/MRB transmission.

4. According to a still further alternative the eNB may trigger handover to neighbor eNB if the conditions to handover procedure are fulfilled based on either normal (non-MBMS) or MBMS measurement reports.

Figure 9:
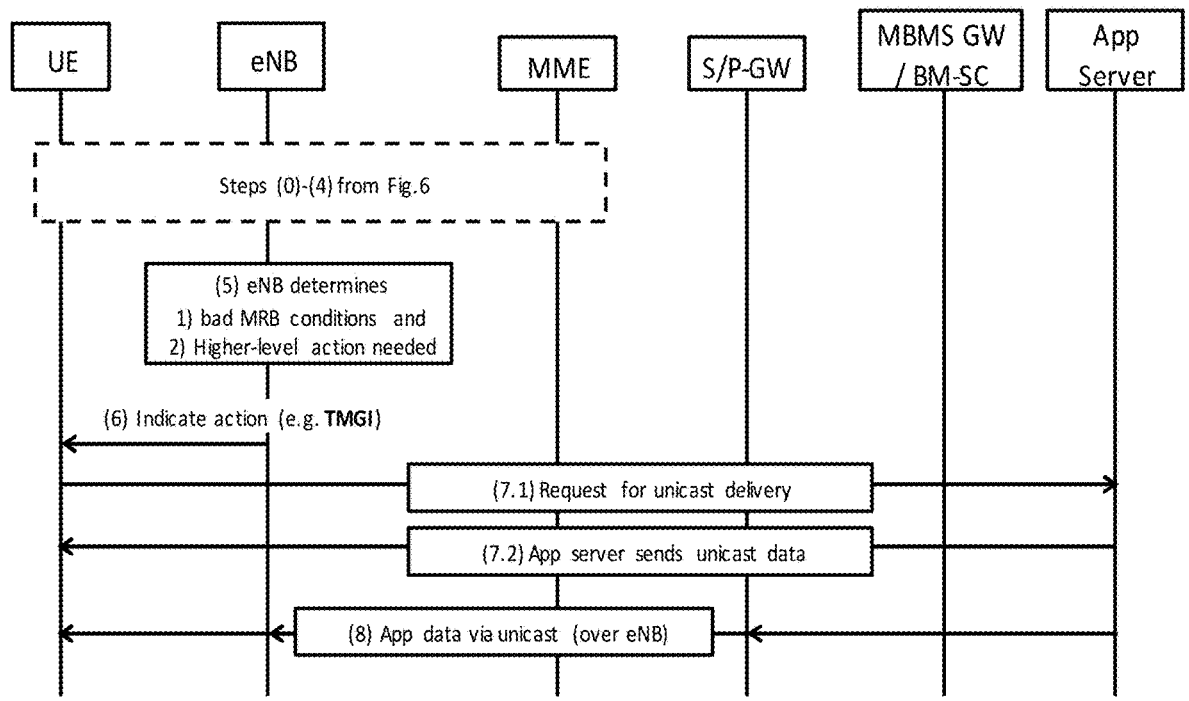
FIG. 9 is a signaling diagram of a scenario where service continuity is achieved based on application level signaling in accordance with an embodiment the present invention.

FIG. 9 is a signaling diagram that illustrates some more details related to step (5.2) of option C from FIG. 6, i.e. FIG. 9 is related to a scenario where service continuity is achieved based on application level signaling. The detailed explanation of FIG. 9 is given as follows:

Steps (0-4), are similar to the ones explained in connection with FIG. 6.

In step (5), eNodeB based on measurement reports from the UE determines that (a) UE is having bad radio conditions, (b) determines whether higher level actions are required or whether the reports indicate only a short period of disruption. If the eNB determines that longer-term actions are needed, e.g. the UE is approaching a neighbor cell where the MBMS service is not configured or the UE is a low mobility device which reports bad MRB conditions for long time, the eNB can decide to indicated higher level action to the UE. It should be noted that "higher level action" means that the poor MRB reception cannot be recovered by radio layer 1 or layer 2 procedures, and therefore, e.g. actions from the application in the UE are needed.

In step (6), once eNB determines that actions are required above the radio layers, e.g. to request for unicast delivery from the communication peer, eNB sends explicit indication to the UE. This indication from eNB to UE could be in the form of RRC signaling. If event-based measurement reports are configured for MBMS/MRB reference signal reporting, events should be configured in such a manner that UE reports poor radio conditions of the MBMS/MRB reference signal appropriately. It should be noted that the eNB takes decision for high-level action, if the eNB cannot guarantee MBMS service continuity on the radio layers. This can happen if the eNB is configured with this solution, or the eNB cannot apply other solutions described herein as embodiments of the present invention (e.g. mapping of MBMS-data over unicast DRB, increase signal strength for MRB transmission, etc.).

Alternatively, after the eNB determines that higher-level actions are appropriate, the eNB can inform the MME, so that the MME can inform the UE, e.g. via NAS signaling. The indication from the MME to UE includes MBMS service ID and appropriate action type, e.g. no longer MRB radio transmission possible, or higher-layer actions needed for service continuity.

Here, it should be noted that the UE needs to implement internal functionality, similar to the functionality described in connection with step (7) of FIG. 6, where the UE is capable to derive/understand the action as indicated by the eNB, and further is able to convey the indication to the impacted/concerned application or internal module/layer.

In step (7.1), once UE receives the indication from the eNB (or MME) about higher-layer actions needed, the UE first determines internally which application is impacted. This can happen e.g. in the NAS layer. With other words, the received indication from eNB in the RRC layer is forwarded to the NAS layer. Then the UE (NAS layer) forwards this indication to the application layer which receives the particular MBMS service (according to the MBMS service ID, TMGI). The UE's application then generates an application layer message to request unicast service delivery by sending a relevant indication to the application server. This application layer message is sent over an existing (or new) EPS bearer to the application server.

In step (7.2), once the App Server receives this request to send data in unicast, it starts sending data over unicast bearer to the UE. This may result in the establishment of new EPS bearer in the 3GPP network.

In step (8), UE starts receiving data via unicast bearer over the serving eNB. If the UE would move out of the coverage footprint of the MBMS reference signal, the UE would keep the service/App data receptions, as the unicast transmission is more flexible (in terms of resource utilization) than the multicast transmission.

After step (8), the UE may inform the eNB and/or MME that the UE no longer receive the MBMS service. With other words the UE deregisters with the eNB and/or with the MME regarding the MBMS service reception. The UE may also deregister for the given MBMS service with the BM-SC.

The embodiments of the invention described above are based on the concept where the RAN (eNB) determines about switch from multicast to unicast delivery. Hereinafter, an embodiment is described which is based on an alternative concept where the decision for the service continuity, i.e. for the switch from multicast to unicast delivery, is taken in the UE. The solutions how the UE can determine the bad radio conditions for MBMS reception can be separated in two main categories: 1) solutions at the 3GPP radio layers (e.g. Physical or MAC layer) or 2) solutions at a higher layer above the 3GPP layers (Application layer or TCP layer).

The UE can determine the poor radio conditions of the MBMS reception based on the packet losses at the higher layer above the 3GPP layers (Application layer or TCP layer). In such a case the layers above the 3GPP layers determine the need to initiate the switch from multicast to unicast delivery. The possible mechanisms to determine the need for App layer actions for service continuity are e.g. 1) the detection of missing packet, or 2) the triggering of retransmission mechanism in the layers above the 3GPP layers. Actually, the application layer may have a re-transmission mechanism for requesting lost packets. If this retransmission mechanism is triggered for a configurable number of times, then the UE can determine that the radio conditions for MBMS reception are poor and the UE can decide to switch to unicast delivery.

Further, the data (streaming) codec used between the BM-SC and UE can also determine that retransmissions are needed. A similar approach is described in 3GPP TS 26.346 in section F.2 for the switching from MBMS to PSS (Packet-switched Streaming Service), however, this approach detects the need for switch after packet losses have already occurred. Hereinafter, this is denoted as "MBMS layer" (or protocol stack generally responsible for performing the MBMS-relevant actions). For example, if the "MBMS layer" would request transmission of the MBMS data from the BM-SC, then the MBMS layer instead of requesting the retransmission can indicate the App layer to initiate request for unicast delivery. Based on this determination for retransmission in the MBMS layer, the UE can determine about the poor radio conditions, and consequently, the UE can request the application layer to take actions to switch from multicast to unicast delivery.

Another embodiment for determining the switching from multicast to unicast delivery at higher layer above the 3GPP layers is to use the sequence number of the IP packets at the transport layer, e.g. TCP or UDP/RTP segments. If the transport layer (or other layer having sequence number of the received packets) determines that a segment/packet is missing, then the transport layer can indicate to the application layer (to which the packets are destined) that there are missing packets and actions from the application layer are needed. In such case, the application layer would request unicast delivery from the application server.

Figure 10:
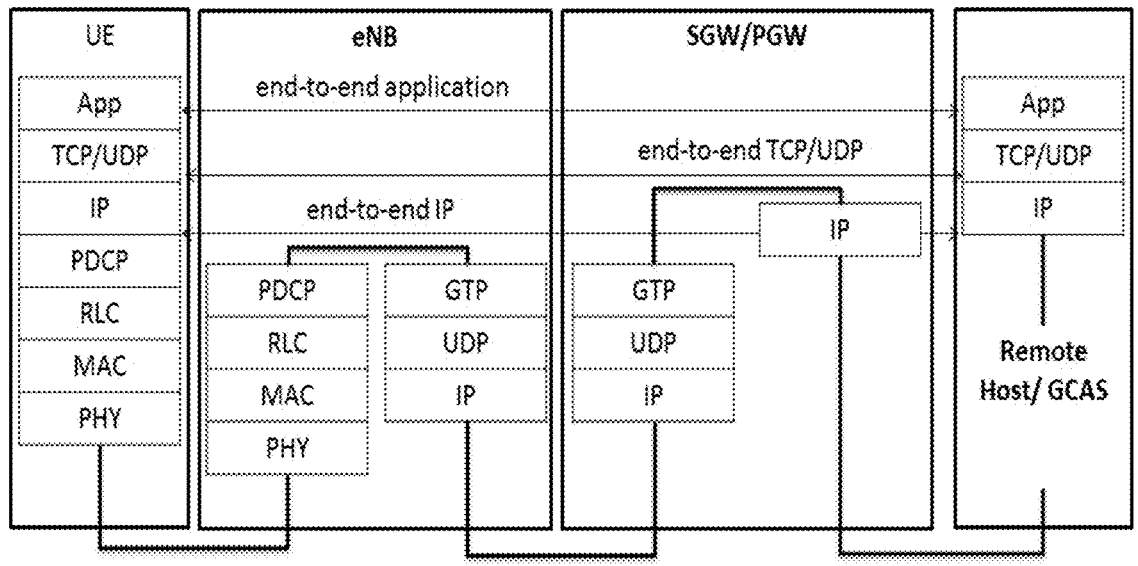
FIG. 10 is a diagram illustrating the LTE data plane protocol stack.

The detection for switch to unicast delivery at the higher layer above the 3GPP layers may have the following drawback. An LTE protocol stack and possible interaction with GCSE is as shown in FIG. 10. As we can be inferred from this figure, there is inherent delay between a packet arriving at the PHY (physical layer) to being decrypted, decoded, etc. and reaching the application layer. Hence, having an application layer trigger for service continuity would essentially mean that there would be significant amount of delay between packet being sent by the GC-AS and the same reaching the group communication application in the UE. Further, there would still be higher delay involved for the completion of bearer modification to unicast if initiated entirely by the GC application in the UE. Whereas, such delays would be absent if the triggering is initiated by the physical layer of the UE by monitoring the link conditions.

Therefore, to overcome the above drawback of delay, the detection of the possible loss of data via multicast transmission, and also possible service disruption, in the 3GPP radio layers (e.g. Physical or MAC layer) has the advantage of avoiding packet losses and less delay. When the UE detects poor radio condition at the 3GPP radio layer(s), an indication is sent internally in the UE to the application which receives the MBMS data. The application can undertake the needed actions to request from the transmitting server a unicast delivery of the group session data. In order for the UE to determine the poor radio conditions at the 3GPP radio layers, the UE needs to be configured with the threshold(s) for the MBMS radio signal strength. The configuration of the thresholds in the UE can be performed e.g. in one of the following manners (the list is not exhaustive):

5. Via application layer signaling from the application server (e.g. GCSE-AS). For example, during the setup of MBMS bearer service, the network can determine based on various parameters, e.g. used modulation and coding scheme, and/or type of service data service, etc., which are the optimal MBMS signal thresholds for switch from multicast to unicast reception. Then this information is conveyed to the BM-SC and the BM-SC can forward the information to the AS (GCSE-AS) over the GC2 interface. Further, the AS can inform the UE via the application layer signaling about the proper radio parameters for the switch from multicast to unicast delivery. After receiving this information, the UE internally forwards this information to the 3GPP layers (RRC, MAC and/or Phy layer).

6. The mobile network operator determines the optimal radio conditions/thresholds for the switch from multicast to unicast delivery and informs the UE via signaling specified in Open Mobile Alliance (OMA) Device Management (DM) Working group, also known as OMA-DM signaling. This is a kind of semi-static configuration in the UE. The received configuration from the OMA-DM signaling should be stored and forwarded to the Phy layer.

7. A RAN node (e.g. eNB) can determine the optimal conditions/thresholds for the switch from multicast to unicast delivery and informs the UE via RRC or System information signaling. Further details about this embodiment will be described below in connection with FIG. 12.

8. The UE can internally determine the radio signal thresholds for switch from multicast to unicast delivery without any configuration from external entities. Optionally the thresholds can be pre-configured by the UE vendor. The mechanism of UE determined thresholds is described in further details in FIG. 11. As shown in this figure, it is assumed that UE internally determines thresholds for various modulation and coding schemes. When the MBMS reference signal or any other measurement which could indicate the signal quality (RSRP, RSSI-RSRP, RSRQ, SINR, BLER measurement of PMCH, etc.) goes below the determined threshold, UE informs the application to initiate unicast service delivery or inform the network using mechanisms described earlier in order to continue receiving group communication data in an uninterrupted manner. For physical layer measurements, work done as part of further MBMS operations support (see for reference RP-131369, "New Work Item Proposal: Further MBMS Operations Support for E-UTRAN") could be reused.

The disadvantage of UE internally determined thresholds is that the UE may not have knowledge about the environment (e.g. urban, rural) and whether the neighbor cells are part of the same MBSFN area. Therefore, in connection with FIG. 12 the configuration of the thresholds via the RAN node (eNB) will be described. The eNB can determine the signal thresholds in a similar way as described in the embodiment of FIG. 11, but additionally considering some of the following conditions: the MBMS bearer coverage (e.g. based on the drive test from other UEs), MCSs, radio environment (e.g. urban, rural), type of media, the configuration of the MBMS bearer in the neighbor cells and or whether the neighbor cells are part of the same MBSFN area, etc.

Figure 12:
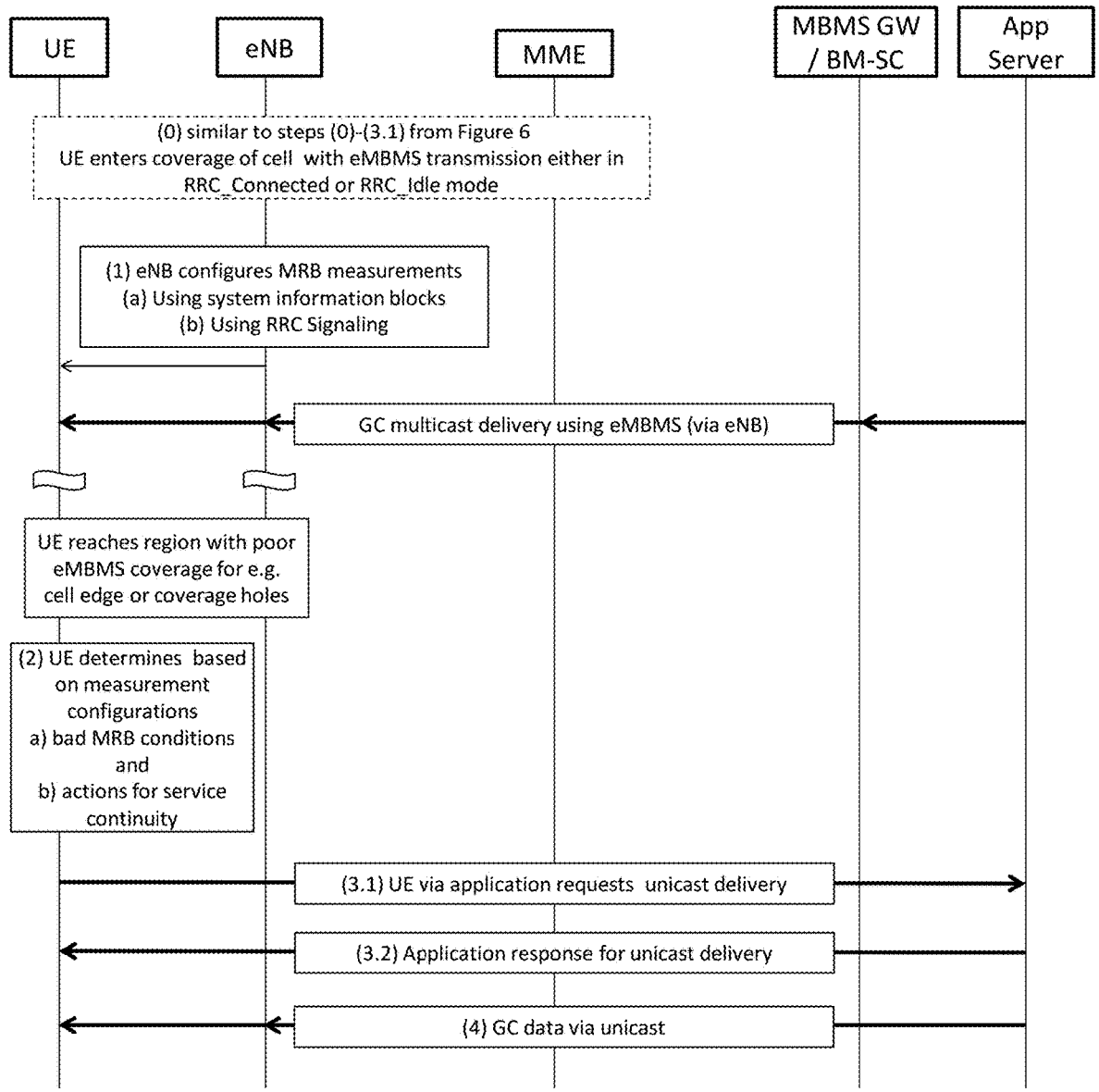
FIG. 12 is a diagram illustrating an embodiment of the present invention where the mobile terminal determines application layer actions based on configurations from a RAN node.

With reference to FIG. 12, the following embodiment describes a mechanism for MBMS reference signal measurement configuration and thresholds in the UE by the eNB. This mechanism is basically derived from the embodiment of the invention described in connection with FIG. 6 enabling service continuity based on eNB involvement. The main concept of this embodiment is that the UE determines and initiates actions (e.g. on the layers above the 3GPP layers, like application layer) to maintain the service continuity based on radio configurations in the UE performed from a RAN node, e.g. eNB. The UE may initiate the actions for service continuity when certain thresholds of the MBMS reference signal measurement are exceeded (e.g. thresholds related to packet, bit and/or block error rates) or under-run (e.g. thresholds related to signal strength). Step (0) shown in FIG. 12 to (3.1) is identical or similar to steps (0) to (3.1) described in connection with FIG. 6. The detailed explanation of FIG. 12 is as follows:

Step (0) is similar to the steps (0)-(3.1) from FIG. 6, whereby a UE subscribed to group communication services, either in RRC_Idle or RRC_Connected mode enters the coverage area of a cell or eNB transmitting group communication services using eMBMS.

In step (1), eNB sends MBMS reference signal threshold configurations to the UE, either (a) using system information blocks which could be read by the UEs in idle and connected state or (b) using RRC signaling by the eNB. The thresholds could depend on the radio configuration used in the cell for eMBMS transmissions, such as modulation and coding scheme, the channel conditions in the cell, etc. In step (1), the UE also starts receiving group communications data using multicast transmissions from the application server. It should be noted that in step (1) in FIG. 12, the order of the reception of multicast service on the one hand and the eNB configuration of MRB measurements on the other hand is arbitrary.

As described in connection with FIG. 6, the eNB is aware about the UE's activated MBMS services (GC services sent over MBMS bearer) and if the UE is in connected state, the eNB can use dedicated RRC signaling to the UE in order to configure the UE with MBMS reference signal thresholds. For this purpose, existing RRC signaling messages or newly defined RRC signaling messages can be used. The use of the configured MBMS signal thresholds is described in step (2).

Now the scenario is considered where the UE reaches either the cell boundary (with a cell that does not have eMBMS transmissions) or regions where the eMBMS reception is poor. As shown in step (2), when the MBMS reference signal quality (or any signal from which MBMS reception quality can be estimated) goes below a threshold configured in step (1), the UE determines in sub-step (a) that the UE has reached a region where the probability of losing multicast signal reception is high, due to bad MRB radio conditions or any other factors due to which multicast reception could be lost. In sub-step (b) the UE initiates actions for maintaining the service continuity. With other words, the exceeding or under-running of the MBMS signal thresholds configured in step (2) is used as a trigger in the UE to perform actions for service continuity for the reception of the MBMS data.

Again, it should be noted that the UE implements internal functionality, similar to the functionality described in connection with step (7) of FIG. 6, where the UE is capable to derive/understand the action as indicated by the eNB, and further is able to convey the indication to the impacted/concerned application or internal module/layer.

One example of the actions performed by the UE upon detection of step (2), is shown in step (3.1) where the UE sends application level signaling using group communications application in the device to trigger unicast service delivery, receiving the response in (3.2). The actions performed by the UE are not limited to the one shown in steps (3.1) and (3.2). For example, the UE may perform signaling to a 3GPP functional entity, e.g. eNB, MME, MBMS-Gateway or BMSC, to inform about losing reception of GC service over MBMS distribution. Then the 3PGG functional entity can initiate actions to keep the reception of GC service data at the UE by performing unicast transmission.

In step (4), the UE starts receiving data via unicast bearer, and stops listening to MBMS radio bearer, once reliable unicast bearer is established.

The possible options for configuring the triggering criteria for the switch from multicast to unicast service delivery in step (3.2) could be similar to the cell reselection criteria defined for IDLE mode mobility in 3GPP TS 36.304, "Evolved Universal Terrestrial Radio Access (E-UTRA); User Equipment (UE) procedures in idle mode," 3GPP Technical Specification, v.11.5.0, September 2013. One possible example would be MBMS reference signal levels in terms of reference signal received power (RSRP), or quality (RSRQ), or SINR goes below a configured threshold. It could also depend on other cell specific reference signal quality values as well, in order to avoid UE entering radio link failure conditions. The scheme could be implemented by conveying this information through extensions of currently defined system information blocks (for e.g. SIB-3 for cell reselection parameters or SIB-13 by extending already available MBMS related parameters). This information could be read by either idle or connected mode UEs, and using explicit signaling by eNB after handover.

Another embodiment of configuring UE with thresholds for triggering the execution of step (3.2) for unicast service delivery involves using extensions of RRC signaling defined in [3]. eNB using extensions of measurement reporting events currently defined for mobility, could signal to the UE regarding when unicast delivery should be triggered. This could be done by configuring absolute thresholds of signal power or quality (RSRP/RSRQ/SINR), and if the signal level goes below this threshold, the UE can trigger application level bearer modification, or by using relative thresholds when the difference between the neighbor cells' signal levels and the serving cell's signal levels are within a configured limit.

Since different modulation and coding schemes can be used for each transport block in LTE, and multicast transmissions have to use the same MCS for a group of users, eNB could apply different MBMS signal thresholds for the switch from multicast to unicast delivery for the different MBMS bearers, e.g. for the different MBSFN configurations or for the transmission of different media types for the same MBMS group. For this purpose the eNB can inform the UE using RRC signaling about the MBMS signal threshold(s) for triggering of unicast service delivery, e.g. this informing is performed for each TMGI (corresponding to received MBMS service). Thus it is possible that different MBMS signal thresholds sets are calculated by the eNB and informed to the UEs for different MBMS bearer services (e.g. for different TMGIs). Having this, a single UE receiving multiple MBMS bearers can have different MBMS signal thresholds configurations. Optionally, the eNB could configure a single threshold for all the UEs in the cell using extensions to SIBs or RRC signaling. Extensions of currently defined SIBs could also be used to signal different thresholds for different MBSFN areas, PMCHs, eMBMS sessions or any other radio parameters used for the transmissions. The modification for RRC signaling could be done in for e.g. ReportConfigEUTRA defined in [2] for UE measurement and reporting triggering. The system information block related signaling could be done by modifying PMCH-InfoList, MBSFN-SubframeConfig, MBSFN-AreaInfoList or any other eMBMS related signaling configurations considered in [2]. It could also be done along with informing the UE regarding MCS configurations used and could be signaled when there are any changes in radio parameters used for MBMS.

Figure 11:
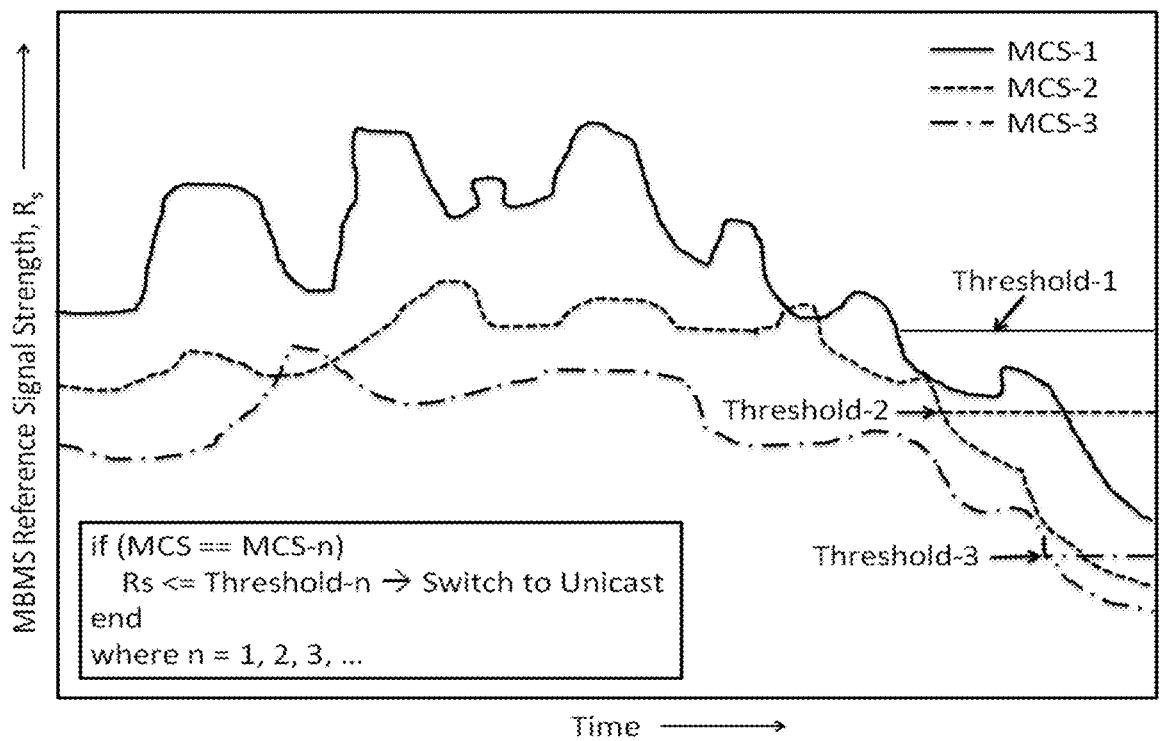
FIG. 11 is a diagram illustrating a mechanism of mobile terminal determined thresholds according to an embodiment of the present invention.

In another alternative to FIG. 12, a variant with minimum impact on the RAN node (eNB) is proposed in FIG. 11. The reason is that in same deployments changes/updates to the existing RAN infrastructure should be avoided and the solutions could be implemented in the UE without signaling impacts with the radio access network. The thresholds for unicast service triggering could be UE specific, based on internal calculations of thresholds, based on previous history of service disruptions, or based on semi-static configurations by external entities such as OMA-DM or using third part application configurations (for e.g. GC-AS) using application layer (data layer) signaling.

Hereinafter, further embodiments will be described that also address the problem of providing service continuity. The main aspect of these embodiments is based on the functionality in the network to decide how to provide service continuity based on the device (UE) and network capabilities. It is described that the UE may have special capabilities to support (e)MBMS service continuity. During the attach procedure the UE indicates its capabilities related to (e)MBMS service continuity. Based on these capabilities and the network capabilities, the network takes decision which solution to apply. In the embodiment described hereinafter the network decides after the attach procedure or after the establishment of the GC session to apply a solution where the eNB indicates to the UE to request unicast delivery.

Figure 13:
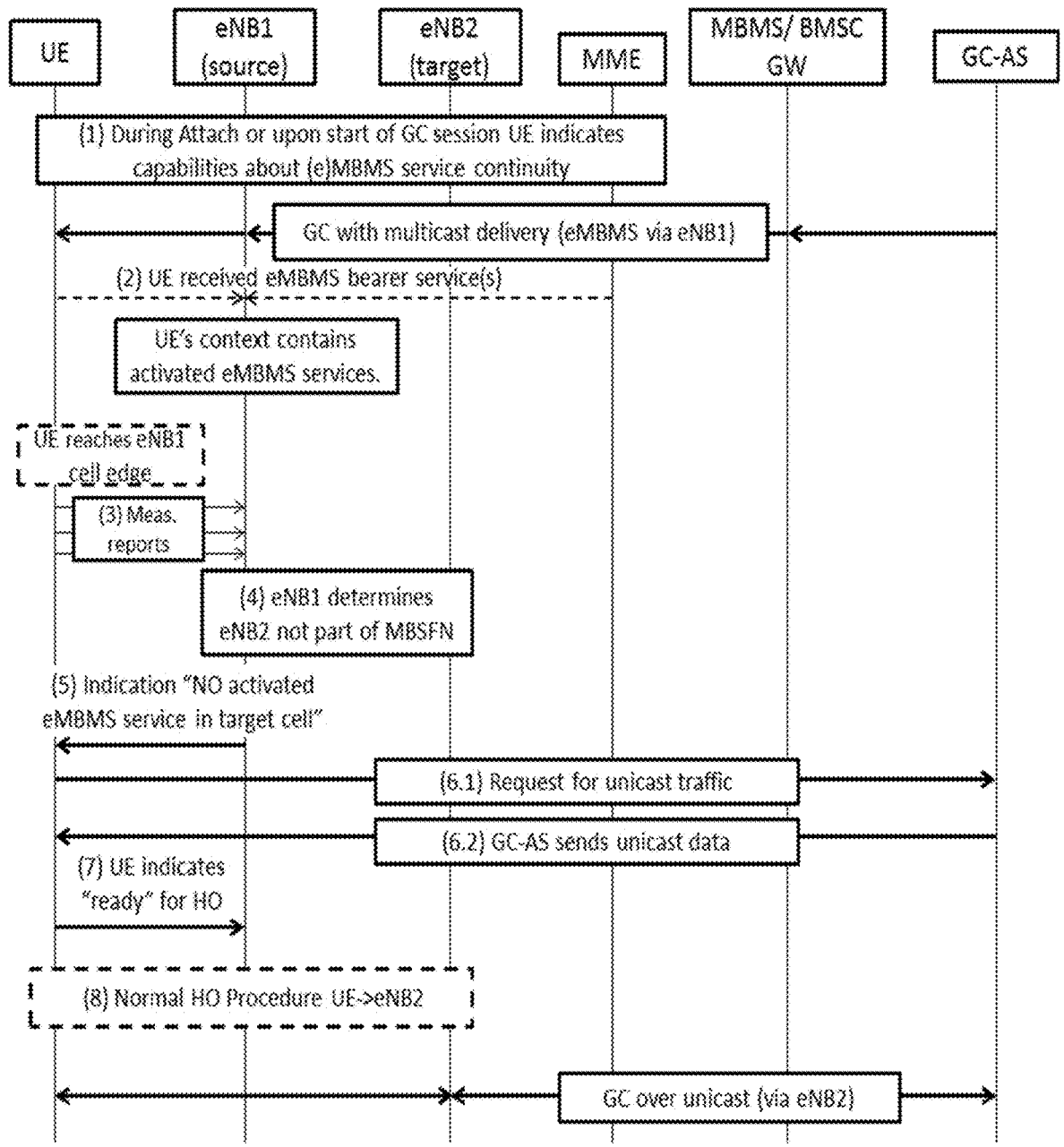
FIG. 13 is a signaling diagram illustrating mobile terminal initiated GC unicast delivery before handover according to an embodiment of the present invention.

A main idea of this embodiment, which is illustrated in FIG. 13, is that prior to the handover the UE initiates unicast delivery from the content provider (GC-AS). It is assumed that the UE is in RRC and NAS CONNECTED state. The initiation of the unicast delivery is an application layer signaling. It is assumed that there is an internal interface between the GC application in the UE and the 3GPP (transport) layer. This internal interface should enable the exchange of information between UE's NAS/AS layer and the application layer. As result of this information exchange between GC application layer and 3GPP NAS/AS layer, new EPS bearer may be established, or an existing EPS bearer can be modified, or the internal routing of GC data/media in the UE can be modified in order to receive the GC data/ media over unicast delivery.

Specifically, FIG. 13 illustrates a procedure for a solution where the UE initiates request for unicast delivery of GC data/media upon eNB indication to UE about loss of (e)MBMS service in the target cell. The handover decision is taken from the source eNB1 according to the legacy mobility concept in 3GPP. The initial assumption is that. the UE receives the GC data/media via a multicast delivery from the content provider (GC-AS) via an (e)MBMS bearer service. The following steps from FIG. 13 describe the details of this solution:

During step (1) the UE exchanges capabilities about support of (e)MBMS bearer service continuity. This capability exchange may happen either (1) during the Attach procedure, e.g. the UE includes the capability as part of the Attach request message, or (2) when the UE starts receiving (e)MBMS bearer services as explicit NAS signaling exchange to MME or RRC signaling to serving eNB.

In step (2) in FIG. 13 the eNB1 maintains information about the (e)MBMS bearer service(s) which the UE currently receives. The eNB can obtain this information either from the UE or from the MME. As a result of this step (2), the eNB1 stores an enhanced UE context including information of the (e)MBMS bearer service(s) currently received by the UE. For example the eNB1 stores the TMGI(s) of the (e)MBMS services received by the UE. It should be noted that in this embodiment the eNB1 does not inform the UE about the (e)MBMS bearer service(s) configuration of the neighbor cells.

In step (3) the UE performs the normal radio measurements of the neighbor cells as part of the mobility procedure in CONNECTED state. When the UE detects threshold for handover event, the UE sends the measurement reports to the source eNB1. This step does not require any changes to the UE.

In step (4), based on the measurement report, the source eNB detects whether the possible target cell offers the MBMS service which the UE actively listens. In this regard it is important to note that in step (2) eNB1 has stored information whether and which MBMS services (TMGIs) are subscribed and actively received by the UE. For the purpose of determining (e)MBMS bearer support, the source eNB1 either maintains information about the neighbor cells and which neighbor cells offer which MBSFN service, or first requests the target eNB2 (according to the measurement report from the UE) or the MME/MCE about the offered MBSFN services. After the reply from the target eNB or MME/MCE, the source eNB determines if the possible target cell offers the MBSFN service.

In step (5), if the source eNB determines that the target cell does not offer the (e)MBMS service(s), the source eNB informs the UE (e.g. via RRC signaling message) about "NO activated eMBMS service in target cell", i.e. the target eNB2 is not part of the MBSFN area. The UE forwards this information from eNB1 internally from the RRC layer to the corresponding application (e.g. GC application) using the (e)MBMS service. This UE internal forwarding of the eNB1's indication may be performed in several ways. For instance, a special API between the RRC layer and application layer may be specified. Alternatively, the RRC layer may forward the indication to NAS layer; then NAS layer forwards the indication via a special API to the application layer.

In step (6.1), the UE's application initiates application level signaling to request the GC-AS to start unicast delivery of GC data/media. In step (6.2) the GC-AS either (a) replies with application level signaling to the UE to confirm the reception and processing of the UE's request; or (b) the GC-AS starts sending data/media via unicast and the UE detects via reception of the data that the request was processed in the GC-AS.

Step (7) can be observed as reply to the indication from step (5). In step (7), the UE indicates to the source eNB1 that the indication from step (5) was successfully received and processed, so that eNB1 can proceed with the handover procedure. The eNB1 delays the sending of "Handover" command to the UE in order to give the opportunity to UE and GC-AS to establish (or at least partially establish) the unicast delivery path with corresponding EPS bearer establishment. There could be several options for determining the delay time. For instance, the eNB1 can wait until the UE indicates that it is "ready" for handover as explained above, or/and the eNB1 can wait for a given configurable time and after expiring of this time, the eNB1 can proceed with the handover procedure, i.e. sending Handover command message to the UE. Applying both options together would avoid waiting too long until the UE acknowledges the processing of the eNB1's indication from step (5).

In step (8), eNB1 initiates the handover procedure according to 3GPP TS23.401.

After completing the handover from eNB1 to eNB2, the UE receives the GC data/media via unicast delivery from the GC-AS via the eNB2.

In summary, the main changes required to UE according to the embodiment described in connection with FIG. 13 are:
  Indicate UE capabilities to the MME or eNB for supporting the (e)MBMS bearer service continuity (related to step (1) in FIG. 13);
  Indicate to MME or eNB currently received (e)MBMS bearer service(s). For example the UE can use the TMGI to indicate this to the MME or eNB (related to step (2) FIG. 13);
  Ability to support the procedure of "NO activated eMBMS service in target cell". This procedure includes the ability to receive an indication from the eNB that particular (e)MBMS bearer service(s), which the UE currently receives, are not supported in the target cell. The UE supports means to forward internally the indication to the corresponding application, i.e. the AS layer informs the NAS layer and it informs the application. In change, the Application informs the NAS layer and AS layer that the indication has been processed. Further as part of this procedure the UE is able to send a kind of "reply" indication to the eNB1 to indicate that the UE is ready for the handover procedure.

The required changes to the eNB are:
eNB is able to exchange capabilities information with UE and/or with MME about the UE's capability of (e)MBMS bearer service continuity (related to step (1) in FIG. 13).
eNB is able to store enhanced UE context (for UE is CONNECTED mode) including the UE's currently received (e)MBMS bearer service(s). This UE context can be dynamically updated by the UE or by the MME (related to step (2) in FIG. 13).
eNB is able to exchange information with the neighbor eNBs in order to determine which (e)MBMS bearer service(s) the neighbor eNBs support (related to step (4) in FIG. 13).
eNB is able to indicate to the UE that in the candidate target cell the currently received (e)MBMS bearer service(s) are not supported, and correspondingly, the eNB1 is able to receive a "reply" indication from the UE. Further, the eNB may implement a timer for delayed triggering the handover procedure after indication to the UE about "NO activated eMBMS service in target cell" (related to steps (5) and (7) in FIG. 13).

According to another embodiment, which relates to an alternative solution particularly to steps 5 and 7 described above, there is no explicit indication from eNB1 to UE about "NO activated eMBMS service in target cell", but instead the eNB1 sends a modified/extended Handover Command message (which could be an RRC message) to the UE which contains the same or similar indication, i.e. "NO activated eMBMS service in target cell". After receiving such an extended Handover Command message, the UE first initiates application level signaling to the GC-AS in order to request unicast delivery of the GC session data. This application level signaling may be the same as described above in connection with steps (6.1) and (6.2) of FIG. 13. Afterwards the UE executes the handover procedure to eNB2. With other words, the main difference to the embodiment described in FIG. 13 is that the indication "NO activated eMBMS service in target cell" is provided to the UE in the Handover Command message and the UE performs the application level signaling in steps (6.1) and (6.2) before starting the synchronization with the target cell.

Another possible alternative is that the UE can be pre-configured with neighbor cells info for (e)MBMS services, i.e. whether the neighbor cells support the (e)MBMS service currently received for GC data. Such a configuration in the UE can be performed either by the eNB to which the UE is currently connected (called source eNB) or by the MME to which the UE currently has a NAS connection (usually the MME knows about the configured (e)MBMS services in the E-UTRAN from the MCE). If such a configuration is performed in the UE, then there is no need to use the explicit indication as shown in FIG. 13 or to use an extended Handover Command. The eNB1 would send non-modified Handover Command message (i.e. according to 3GPP TS23.401, "General Packet Radio Service (GPRS) enhancements for Evolved Universal Terrestrial Radio Access Network (E-UTRAN) access", 3GPP Technical Specification, v.12.1.0, June 2013) and the UE based on its configuration would decide to first initiate application level signaling to the GC-AS to request unicast delivery, and afterwards the UE would start to execute the handover procedure.

The main benefits of the above embodiments are 1) service continuity, i.e. no data flow interruption is perceived by the application layer and 2) the solution works even in case of (e)MBMS services provided in only one cell or a small number of cells where all cells can be boundary cells.

While the described embodiments can provide service continuity, there are also some shortcomings: First, that may be an increased delay of the handover execution procedure, as the application level signaling, i.e. steps (6.1) and (6.2) of FIG. 13, are performed after the handover preparation procedure and before the handover synchronization procedure (i.e. before the UE start the synchronization with the target eNB2). Second, there is no network guarantee for the service continuity, i.e. the network doesn't know if the UE has successfully performed the application level signaling.

One other aspect that considered in the context of embodiments of the present invention is the case where the UE moves into (e)MBMS bearer service (MBSFN area) coverage whereas unicast delivery of the GC session data was used before the movement. In such case it is beneficial if the UE switches from unicast to multicast delivery in order to better utilize the radio resources. The problem is how does the UE perceive that the GC service data that is currently received via unicast delivery is also distributed over (e)MBMS bearer service.

One possible solution would be to configure the UE via application level signaling (i.e. from GC-AS) with cell IDs in which the GC service is distributed via (e)MBMS bearer service. Then an UE internal API between the Access Stratum and the Application layer is needed in order to forward information about the current cell ID from the 3GPP transport layer to the application layer. When the application layer determines that the UE entered a cell which is a part of the MBSFN area, the UE can initiate application-level signaling to the GC-AS to request multicast delivery and stop the unicast delivery.

Some disadvantages of this possible solution based on the application-level signaling from GC-AS are:

The GC-AS should know the cell IDs in which the (e)MBMS bearer service is configured. This could be a problem as the 3GPP mobile operator may not provide such information outside the 3GPP network and if the GC-AS is a $3^{rd}$ party server, the GC-AS would not know the MBSFN configuration area.

There is a need of frequent update which would result in increased signaling load. Each time an (e)MBMS bearer service is activated, deactivated or modified, the 3GPP operator should update the GC-AS application. Consecutively the GC-AS should update all UEs currently receiving the GC service data via unicast delivery. This application-level update is performed and the UEs are required to store this information even if the UEs will never enter the MBSFN area.

A solution to overcome the above disadvantages is proposed herewith which is based on indication provided to a UE receiving GC service via unicast delivery by the 3GPP network (using 3GPP signaling means like NAS signaling or RRC signaling) when the UE moves into the MBSFN area coverage.

In one alternative of the solution, the UE during GC service setup procedure (e.g. during unicast bearer setup for GC session) indicates to the MME the service/session group identifier (GC-ID) identifying the GC service session. One example for GC-ID can be the APN used for the GC service, another example can be a special call ID. The MME should maintain UE's context storing the currently activate GC-ID. Other UEs using the same GC service should use the same GC-ID. When and if an (e)MBMS bearer service is setup in the 3GPP network, the MME should maintain a mapping of the (e)MBMS bearer service's TMGI with the GC-ID. In this way the MME determines that the unicast EPS bearer established for GC service over eNB2 is used for the same service as the (e)MBMS bearer service provided by eNB2 as well. Since the MME knows the all cells configured for the (e)MBMS bearer service, when a UE (in CONNECTED state) moves into a cell transmitting the (e)MBMS bearer service having GC-ID same as the UE's currently used GC-ID, the MME determines (based on the GC-ID) that the UE receives the same GC service data over unicast bearer which is also provided over the (e)MBMS bearer service. The MME can indicate to the UE that the GC service data is available over (e)MBMS service in the current cell and the MME can indicate (e)MBMS's TMGI to the UE. The UE initiates 3GPP procedures, e.g. signaling to BMSC to receive the security parameters and scanning the SIB for (e)MBMS resources as described in 3GPP TS23.246, to start receiving the GC data/media via (e)MBMS bearer service. Additionally the UE would perform application-level signaling to GC-AS to indicate the reception of the GC service over (e)MBMS bearer service and to indicate to GC-AS that the unicast delivery can be terminated.

Figure 14:
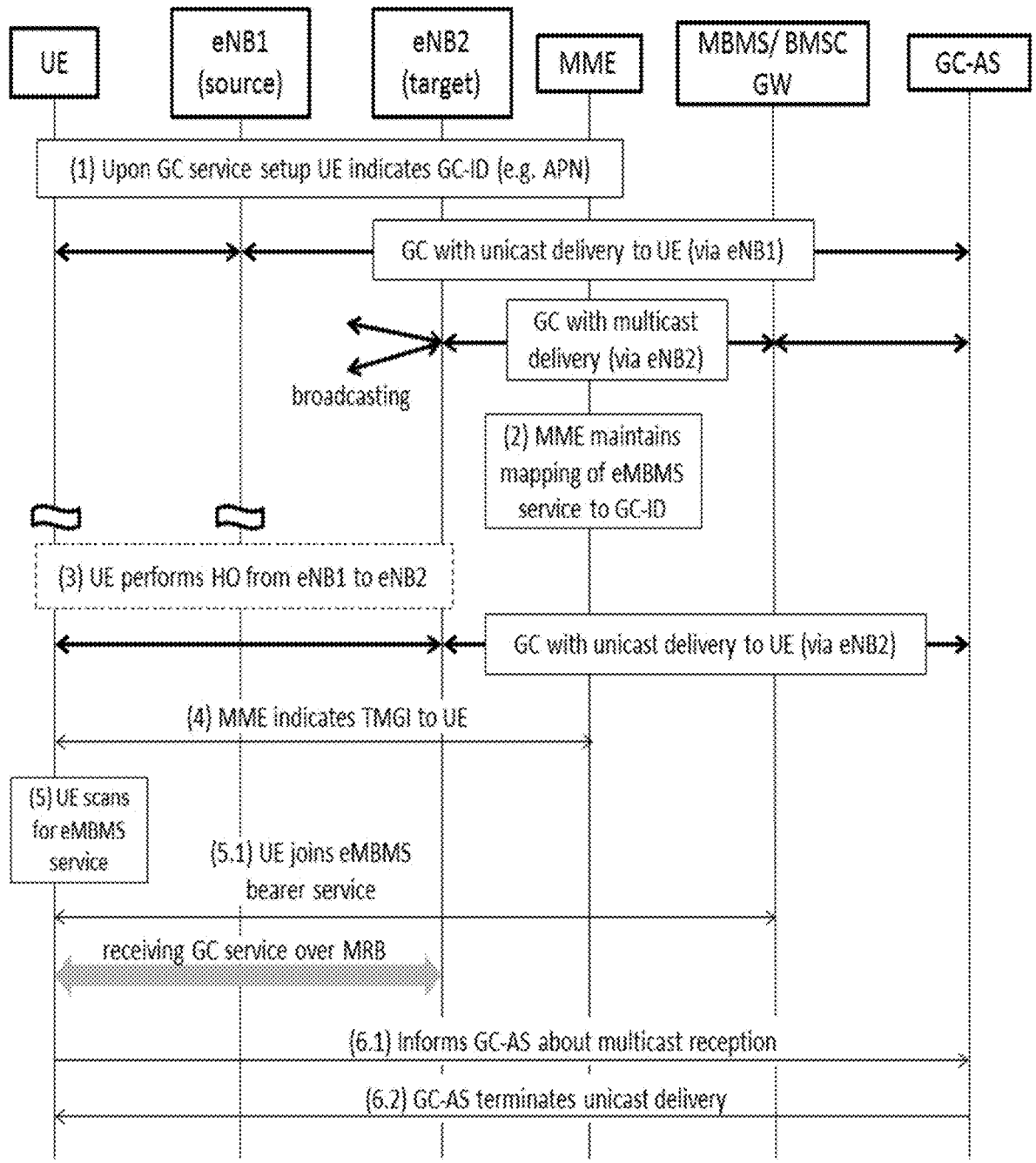
FIG. 14 is a signaling diagram illustrating a switch scenario from unicast to multicast delivery upon the mobile terminal entering MBSFN area according to an embodiment of the present invention.

FIG. 14 shows the solution explained above about maintaining the service continuity when the UE enters MBSFN area and switch from unicast to multicast delivery is performed. The thick arrows in FIG. 14 show data flow and the thin arrows show the signaling flow between the functional entities. The steps from FIG. 14 are described as follows:

In step (1) the UE establishes GC service over eNB1. As eNB1 is not part of the (e)MBMS bearer service or no (e)MBMS bearer service has been established yet, the GC service data delivery from GC-AS to UE is via unicast bearer. The MME may use the APN of the Group communication session as GC-ID. During the GC service establishment, the UE optionally may indicate a GC-ID for the specific Group communication session.

It is assumed that eNB2 is part of (e)MBMS bearer service that can be established before or after the UE established the GC service via unicast delivery. Anyway, from the UE's point of view, the (e)MBMS bearer service can be seen as pre-established prior to the handover procedure.

In step (2), the MME maintains the GC-ID of the established (e)MBMS bearer service (e.g. to eNB2). The MME is able to map the relation of the GC-ID of the unicast bearers with the GC-ID of the multicast bearers. In case of MME pool area where multiple MMEs are available, information exchange between the MMEs, e.g. via S10 reference point, is exchanged in order to update each other about the available (e)MBMS bearer service (and the corresponding GC-IDs) in the MME pool area.

In step (3) the UE performs a handover from eNB1 to eNB2. This is a handover procedure as described in [2]. Usually after the handover procedure the UE receives the GC service data over unicast delivery via eNB2.

However, if the signaling exchange described in step (4) is performed during the handover procedure step (3) itself, it is possible that the UE starts pretty soon the reception of the GC service data over (e)MBMS bearer in eNB2's cell, and thus, the UE can immediately start to perform steps (6.1) and (6.2). With other words, steps (3) and (4) can be integrated during the handover procedure and the GC service reception over unicast delivery can be obsolete, as the UE can quickly join the (e)MBMS bearer service.

In step (4), the MME determines that the unicast EPS bearer established for GC service over eNB2 is used for the same service as the (e)MBMS bearer service provided by eNB2 as well. Say it differently, the MME determines that the UE participates the same GC session as the one provided over the (e)MBMS bearer service. For example the MME determines that the GC-ID of the unicast bearer and the (e)MBMS bearer service are the same. After determining the relation of the GC services over unicast EPS bearer and (e)MBMS bearer service over eNB2, the MME indicates to the UE that the GC service can be obtained via (e)MBMS bearer service, and more specifically the MME indicates the TMGI of the (e)MBMS bearer service. It is assumed that the GC service received by the UE and the GC service distributed over (e)MBMS bearer service are the same, i.e. if the GC service received by the UE includes multiple public safety groups then the GC service over the (e)MBMS bearer service should include the same public safety groups. The MME shall have means to determine the exact mapping of GC service distributed over unicast EPS bearer and (e)MBMS bearer.

The MME can use NAS signaling message (e.g. NAS Information message) to indicate to the UE the available (e)MBMS bearer service and the corresponding TMGI.

It should be noted that step (4) can be a separate signaling procedure between MME and UE as described in FIG. 14, but it can also be performed during the handover procedure in step (3). With other words the signaling from MME to UE may be a part of the handover procedure.

In step (5) after the UE has been indicated about the available (e)MBMS bearer service in the current cell of eNB2, the UE starts scanning the broadcasted cell system information (SIB) to discover the radio resources at which the (e)MBMS bearer service is broadcasted. Additionally, the UE may initiate procedures to join the (e)MBMS bearer service as described in 3GPP TS23.246. After steps (5) and (5.1) the UE is able to receive the GC service via (e)MBMS bearer service broadcasted over MRB (P2M radio bearer).

In steps (6.1) the UE uses application-level signaling to inform the GC-AS about the ability to receive GC service data over (e)MBMS bearer service. In step (6.2) the GC-AS can acknowledge the reception of the message in step (6.1) and to terminate the transmission of GC service data over unicast delivery.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A user equipment (UE) for providing service continuity when the UE is about to move out of coverage of a corresponding Multimedia Broadcast Multicast Service (MBMS), the UE being configured to:
   receive MBMS related data, as part of a group communications service, via an MBMS bearer;
   detect that the UE is suffering from a bad MBMS bearer condition for the corresponding MBMS service;
   inform a server of the bad MBMS conditions to initiate switching to establish a unicast bearer;
   wherein, if there is downlink data to deliver during switching, the UE is configured to begin to receive the downlink data via unicast and to continue to receive downlink data via the MBMS bearer until the switching to establish the unicast bearer is complete; and
   ceasing to receive the downlink data via the MBMS bearer and continuing to receive data via the unicast bearer;
   wherein, the UE is configured to determine a quality of the MBMS bearer relative to a threshold for indicating that the MBMS bearer quality is not acceptable, wherein when the threshold is reached, the UE is configured to send a message to the server accordingly, and wherein the threshold used to indicate MBMS bearer quality is dependent on a service type.

2. A method performed by user equipment (UE) for providing service continuity when the UE is about to move out of coverage of a corresponding Multimedia Broadcast Multicast Service (MBMS), the method comprising:
   receiving MBMS related data, as part of a group communications service, via an MBMS bearer;
   detecting that the UE is suffering from a bad MBMS bearer condition for the corresponding MBMS service;
   informing a server of the bad MBMS conditions to initiate switching to establish a unicast bearer;

wherein, if there is downlink data to deliver during switching, the UE begins to receive the downlink data via unicast but continues to receive downlink data via the MBMS bearer until the switching to establish the unicast bearer is complete; and ceasing to receive the downlink data via the MBMS bearer and continuing to receive data via the unicast bearer;

wherein, the user equipment determines a quality of the MBMS bearer relative to a threshold for indicating that the MBMS bearer quality is not acceptable, wherein when the threshold is reached the UE sends a message to the server accordingly, and wherein the threshold used to indicate MBMS bearer quality is dependent on a service type.

3. An application server for providing service continuity when a user equipment (UE) is about to move out of coverage of a corresponding Multimedia Broadcast Multicast Service (MBMS), the application server being configured to:

transmit MBMS related data, as part of a group communications service, via an MBMS bearer;

receive from the UE a notification informing the server of a bad MBMS conditions to initiate switching to establish unicast transmission;

wherein, if there is downlink data to deliver during switching, the server is configured to begin to transmit the downlink data via unicast and to continue to transmit downlink data via the MBMS bearer until the switching to establish a unicast bearer is complete; and ceasing to transmit the downlink data via the MBMS bearer and continuing to transmit data via the unicast bearer;

wherein when a threshold for indicating that the MBMS bearer quality is reached, the application server is to configured to receive a message from the UE to indicate that the UE has determined that a quality of the MBMS bearer relative to the threshold is not acceptable and wherein the threshold used to indicate MBMS bearer quality is dependent on the service type.

4. A method performed by an application server for providing service continuity when a user equipment (UE) is about to move out of coverage of a corresponding Multimedia Broadcast Multicast Service (MBMS), the method comprising:

transmitting MBMS related data, as part of a group communications service, via an MBMS bearer;

receiving from the UE a notification informing the server of a bad MBMS conditions to initiate switching to establish unicast transmission;

wherein, if there is downlink data to deliver during switching, the server is configured to begin to transmit the downlink data via unicast and to continue to transmit downlink data via the MBMS bearer until the switching to establish a unicast bearer is complete; and ceasing to transmit the downlink data via the MBMS bearer and continuing to transmit data via the unicast bearer;

wherein when a threshold for indicating that the MBMS bearer quality is reached, the application server is to configured to receive a message from the UE to indicate that the UE has determined that a quality of the MBMS bearer relative to the threshold is not acceptable and wherein the threshold used to indicate MBMS bearer quality is dependent on the service type.

5. The UE according to claim 1, wherein the UE is configured to transmit MBMS related radio measurement results to a base station.

6. The UE according to claim 5, wherein the MBMS related radio measurements results include results of measurements on one or more of radio bearer signal strength, decoding errors, and UE error rates of received MBMS data.

7. The UE according to claim 5, wherein a MBMS signal frequency network (MBSFN) carrier symbol is employed as a reference signal for generation of the MBMS related radio measurement results of the UE.

8. The UE according to claim 5, wherein the UE MBMS related radio measurement reports to the base station by means of radio resource control (RRC) signaling.

9. The UE according to claim 1, wherein the UE is configured to receive MBMS related thresholds from a base station for configuring the UE to send the MBMS related radio measurement results to the base station.

10. The UE according to claim 9, wherein the UE is configured to use the MBMS related thresholds to trigger actions to avoid packet losses of MBMS data.

* * * * *